(12) United States Patent
Surjaatmadja

(10) Patent No.: US 9,227,204 B2
(45) Date of Patent: Jan. 5, 2016

(54) HYDRAJETTING NOZZLE AND METHOD

(71) Applicant: Halliburton Energy Services, Inc., Houston, TX (US)

(72) Inventor: Jim B. Surjaatmadja, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 282 days.

(21) Appl. No.: 13/712,556

(22) Filed: Dec. 12, 2012

(65) Prior Publication Data

US 2013/0098043 A1    Apr. 25, 2013

Related U.S. Application Data

(63) Continuation-in-part of application No. 13/151,074, filed on Jun. 1, 2011.

(51) Int. Cl.
| | |
|---|---|
| *E21B 43/114* | (2006.01) |
| *B05B 1/34* | (2006.01) |
| *F41F 1/00* | (2006.01) |
| *F02C 7/22* | (2006.01) |
| *E21B 41/00* | (2006.01) |

(52) U.S. Cl.
CPC .............. *B05B 1/34* (2013.01); *E21B 41/0078* (2013.01); *E21B 43/114* (2013.01); *F02C 7/22* (2013.01); *F41F 1/00* (2013.01)

(58) Field of Classification Search
CPC ............................ E21B 41/0078; E21B 43/114
USPC ............... 239/589, 591, 601; 166/222, 308.1, 166/311, 376, 55, 177.5
See application file for complete search history.

(56) References Cited

U.S. PATENT DOCUMENTS

| | | |
|---|---|---|
| 1,948,890 A | 2/1934 | Sims et al. |
| 3,066,735 A | 12/1962 | Zingg |
| 4,184,638 A | 1/1980 | Ogasawara et al. |
| 5,060,725 A | 10/1991 | Buell |
| 5,125,582 A | 6/1992 | Surjaatmadja et al. |
| 5,361,856 A | 11/1994 | Surjaatmadja et al. |
| 5,494,103 A | 2/1996 | Surjaatmadja et al. |
| 5,499,678 A | 3/1996 | Surjaatmadja et al. |
| 5,765,642 A | 6/1998 | Surjaatmadja |

(Continued)

FOREIGN PATENT DOCUMENTS

WO     2012166550 A2    12/2012

OTHER PUBLICATIONS

Foreign communication from a related counterpart application—Invitation to Pay Additional Fees, PCT/US2012/039443, Oct. 25, 2013, 5 pages.

(Continued)

*Primary Examiner* — Brad Harcourt
(74) *Attorney, Agent, or Firm* — John W. Wustenberg; Baker Botts L.L.P.

(57) ABSTRACT

A jetting device comprises a body, and an interior flow path within the body. The interior flow path comprises a flow section, an expansion section, and a shoulder formed at the intersection of the flow section and the expansion section. The length and diameter of the expansion section are configured to allow a portion of the pressure of the fluid downstream of the expansion section to provide power to a fluid flowing through the nozzle when the fluid is flowing through the nozzle.

3 Claims, 10 Drawing Sheets

(56) References Cited

U.S. PATENT DOCUMENTS

| | | | |
|---|---|---|---|
| 6,286,599 | B1 | 9/2001 | Surjaatmadja et al. |
| 6,427,776 | B1 | 8/2002 | Hoffman et al. |
| 6,662,874 | B2 | 12/2003 | Surjaatmadja et al. |
| 6,719,054 | B2 | 4/2004 | Cheng et al. |
| 6,725,933 | B2 | 4/2004 | Middaugh et al. |
| 6,779,607 | B2 | 8/2004 | Middaugh et al. |
| 6,938,690 | B2 | 9/2005 | Surjaatmadja |
| 7,090,153 | B2 | 8/2006 | King et al. |
| 7,287,592 | B2 | 10/2007 | Surjaatmadja et al. |
| 7,337,844 | B2 | 3/2008 | Surjaatmadja et al. |
| 7,343,975 | B2 | 3/2008 | Surjaatmadja et al. |
| 7,571,766 | B2 | 8/2009 | Pauls et al. |
| 7,617,871 | B2 | 11/2009 | Surjaatmadja et al. |
| 7,673,673 | B2 | 3/2010 | Surjaatmadja et al. |
| 7,775,285 | B2 | 8/2010 | Surjaatmadja et al. |
| 7,832,481 | B2 | 11/2010 | Martindale |
| 7,841,396 | B2 | 11/2010 | Surjaatmadja |
| 7,849,924 | B2 | 12/2010 | Surjaatmadja et al. |
| 7,963,331 | B2 | 6/2011 | Surjaatmadja et al. |
| 8,061,426 | B2 | 11/2011 | Surjaatmadja |
| 8,104,539 | B2 | 1/2012 | Stanojcic et al. |
| 2004/0206494 | A1 | 10/2004 | Stephenson et al. |
| 2007/0034282 | A1* | 2/2007 | Thorpe et al. ............... 141/206 |
| 2007/0261851 | A1 | 11/2007 | Surjaatmadja |
| 2008/0060810 | A9 | 3/2008 | Nguyen et al. |
| 2010/0102139 | A1 | 4/2010 | Hursen |
| 2010/0243253 | A1 | 9/2010 | Surjaatmadja et al. |
| 2012/0118568 | A1 | 5/2012 | Kleefisch et al. |
| 2012/0305679 | A1 | 12/2012 | Surjaatmadja et al. |

OTHER PUBLICATIONS

Surjaatmadja, Jim B., et al., "Harvesting Downstream Energy to Improve Efficiency: Creating Apparent Discharge Coefficients of Jet Nozzles Greater Than 1.3," IMECE2013-62062, Nov. 13-21, 2013, pp. 1-9, ASME, San Diego, California.

Office Action dated Sep. 3, 2014 (10 pages), U.S. Appl. No. 13/151,074, filed Jun. 1, 2011.

Office Action dated Sep. 17, 2013 (15 pages), U.S. Appl. No. 13/151,074, filed Jun. 1, 2011.

Office Action (Final) dated Feb. 12, 2014 (13 pages), U.S. Appl. No. 13/151,074, filed Jun. 1, 2011.

Foreign communication from a related counterpart application—International Search Report and Written Opinion, PCT/US2012/039443, Feb. 14, 2014, 14 pages.

* cited by examiner

HYDRAJETTING NOZZLE AND METHOD

CROSS-REFERENCE TO RELATED APPLICATIONS

This application is a continuation-in-part of and claims priority to U.S. patent application Ser. No. 13/151,074, filed on Jun. 1, 2011, published as US 2012/0305679 A1 and entitled "Hydrajetting Nozzle and Method," by Jim B. Surjaatmadja, et al., which is incorporated herein by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Hydrocarbon-producing wells often are stimulated by hydraulic fracturing operations, wherein a fracturing fluid may be introduced into a portion of a subterranean formation penetrated by a wellbore at a hydraulic pressure sufficient to create or enhance at least one fracture therein. Stimulating or treating the wellbore in such ways increases hydrocarbon production from the well. The fracturing equipment may be included in a service assembly used in the overall production process.

In some hydraulic fracturing operations, the fracturing fluid enters the subterranean formation through one or more openings or bores. The openings may be formed using a variety of techniques including jetting, perforating using explosive charges, and using casing valves. Jetting requires that a fluid pass through a nozzle at high pressure, where the fluid is generally supplied through the use of pumps or other pressurization equipment at the surface of the wellbore. The use of numerous openings may require large volumetric flow rates of fluids at high pressure to form the appropriate openings. These high flow rates can result in a large pressure drop due to friction and other internal fluid forces, which is compounded by the increasing flow path lengths associated with wells being drilled to increasing depths. The maximum operating pressures of the pumping equipment therefore limit the flow rates and number of openings that can be formed using jetting in the subterranean formation.

SUMMARY

Disclosed herein is a jetting tool comprising a nozzle with a coefficient of discharge greater than 1.0. The jetting tool may have a length and a diameter of an expansion section of the nozzle configured such that a fluid stream diameter of a fluid stream discharged from the nozzle is equal to the diameter of the expansion section at an outer end of the nozzle. The nozzle may have a pressure drop within the expansion section of greater than about 10% as compared to the pressure at an outer edge of a comparative nozzle not having an expansion section. In addition, the nozzle may have an increased flowrate of fluid through the nozzle of greater than about 10% as compared to a comparative nozzle not comprising an expansion section when exposed to the same pressures.

Further disclosed herein is a jetting nozzle comprising a body, and an interior flow path within the body. The interior flow path comprises a flow section; and an expansion section. The expansion section has a diameter 1.01 to 1.5 times greater than a diameter of the flow section. A length and diameter of the expansion section are configured to prevent a backflow of fluid into the expansion section when a fluid is flowing through the nozzle. The body may be constructed of an abrasion resistant material, an erosion resistant material, or an abrasion and erosion resistant material. The interior flow path may also have an inlet section. A length of the flow section may be greater than about three times the diameter of the flow section. The length of the expansion section may be between about one half of the diameter of the flow section and about four times the diameter of the flow section. The expansion section may comprise a chamber between a fluid flowing through the jetting nozzle and the inner edge of the expansion section, and the chamber may have a reduced pressure relative to a pressure of an ambient fluid outside of the nozzle. The expansion section may be having an increasing diameter in the direction of flow (e.g., flared out), for example, for compressible fluids. The nozzle may have a coefficient of discharge of greater than 1.0.

Still further disclosed herein is a method of jetting comprising: providing a pressurized fluid to a nozzle; and allowing the pressurized fluid to flow through the nozzle, wherein the nozzle has a coefficient of discharge of greater than 1.0. The nozzle may be part of a service tool servicing a wellbore disposed in a subterranean formation, and the pressurized fluid may comprise an abrasive wellbore servicing fluid. The method may also include forming a fluid jet at the outlet of the nozzle, where the fluid jet may have a velocity of from about 300 feet per second to about 2000 feet per second or higher. The fluid jet may have a velocity of from about 50 feet per second to about 2700 feet per second or higher. The method may also include forming an eroded slot or a perforation tunnel in the subterranean formation with the fluid jet. The method may also include introducing the same fluid and/or a second pressurized fluid into the subterranean formation at a pressure sufficient to form one or more fractures in fluid communication with the slot or the perforation tunnel. The method may also include allowing one or more hydrocarbons to flow from the one or more fractures through the slot or the perforation tunnels and into the wellbore.

In an embodiment, a jetting device comprises a body, and an interior flow path within the body. The interior flow path comprises a flow section, an expansion section, and a shoulder formed at the intersection of the flow section and the expansion section. The length and diameter of the expansion section are configured to allow a portion of the pressure of the fluid downstream of the expansion section to provide power to a fluid flowing through the jetting device when the fluid is flowing through the jetting device. A length and a diameter of an expansion section of the jetting device may be configured such that a fluid stream diameter of a fluid stream discharged from the jetting device is less than the diameter of the expansion section at an outer end of the jetting device. The portion of the pressure of the fluid downstream of the expansion section may be at least about 10% of the pressure of the fluid downstream of the expansion section, and the portion of the pressure of the fluid downstream of the expansion section may be less than about 80% of the pressure of the fluid downstream of the expansion section.

In an embodiment, a flow device comprises a body, and an interior flow path within the body. The interior flow path comprises a flow section, an expansion section, and a shoulder formed at the intersection of the flow section and the expansion section. The length and diameter of the expansion section are configured to control the amount of backflow of fluid into the expansion section when a fluid is flowing through the flow device. The expansion section may have an area about 1.01 to about 1.5 times greater than the area of the flow section. The expansion section may comprise a chamber between a fluid flowing through the interior flowpath and the inner edge of the expansion section. The flow device may comprise a valve seat, and the valve seat may also include a sealing element disposed in the interior flow path. The sealing element may be configured to transition between an open position allowing fluid flow through the interior flow path and a closed position blocking fluid flow through the interior flow path. The flow device may comprise a pump discharge valve, and the pump discharge valve may also include a poppet disposed adjacent the body. The interior flow path may be disposed within the body between the body and the poppet, and a power requirement for a pump comprising the pump discharge valve may have a power consumption between about 1% and about 5% less than a comparative pump that does not comprise the flow section, expansion section, and shoulder. The flow device may comprise an exhaust pipe, and an engine may be coupled upstream of the exhaust pipe. A fuel efficiency for the engine may be between about 2% and about 10% greater than a comparative engine that is not coupled to an exhaust pipe comprising the flow section, expansion section, and shoulder. The flow device may comprise a launch tube, and the launch tube may be configured to have a fluid flowing through the interior flow path when a projectile is launched from the flow section through the expansion section. The flow device may comprise a turbine engine, and the turbine engine may comprise the flow section, the expansion section, and the shoulder between an inlet and a combustion section and/or between the combustion section and an exhaust. The flow device may comprise a blower assembly, and the interior flow path may be configured to receive a fluid from a blower. The flow device may comprise of a water jet propulsion for an underwater vehicle; achieving similar improvements in efficiencies. The deeper the position, the more efficient it is. The interior flow path may be configured to allow a portion of a flow energy of the fluid flowing through the flow device to be derived from a pressure downstream of the flow device.

In an embodiment, a method of jetting comprises providing a pressurized fluid to an interior flow path disposed in a device body, passing the pressurized fluid through a flow section in the interior flow path and into an expansion section in the interior flow path, expanding the fluid into an expansion section, receiving a fluid within a chamber formed within the expansion section from an environment adjacent an end of the expansion section, and forming a fluid stream. At least one of the velocity or flowrate of the fluid stream is based on the expansion of the fluid into the expansion section and the fluid received into the chamber. The interior flow path may be part of a service tool servicing a wellbore disposed in a subterranean formation. The pressurized fluid may comprise an abrasive wellbore servicing fluid. The device body may comprise a valve body. The device body may comprise at least one of an exhaust pipe, a launch tube, a turbine engine, or a blower assembly, and the environment adjacent an end of the expansion section may be at atmospheric pressure, or the hydrostatic pressure within an ocean or wellbore. The fluid may comprise a gas or a liquid. At least a portion of a flow energy of the fluid stream may be derived from a pressure of the fluid in the environment adjacent an end of the expansion section.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION OF THE EMBODIMENTS

Figure 1A:
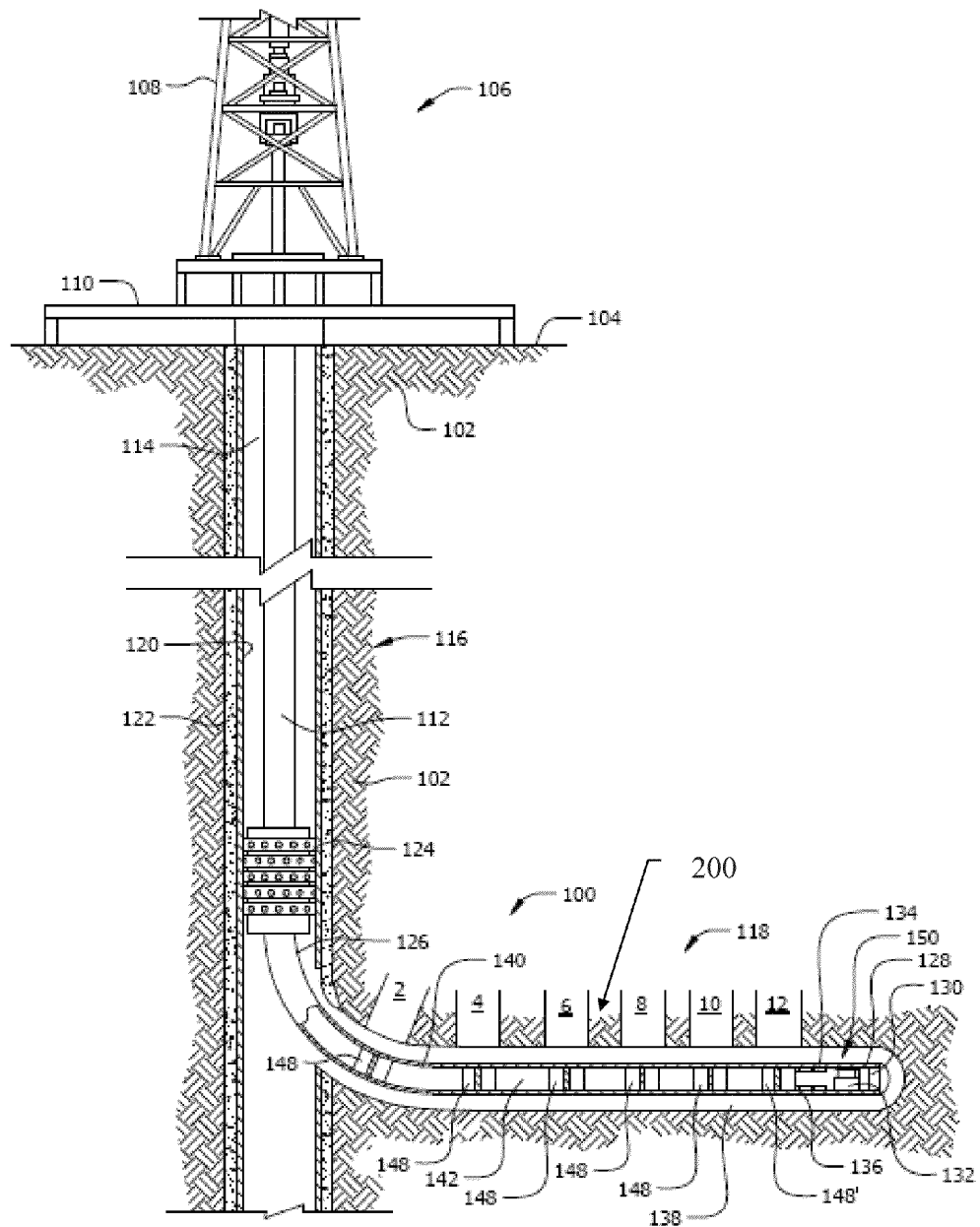
FIG. 1A is a simplified cross-sectional view of an embodiment of a wellbore servicing apparatus in an operating environment.

In the drawings and description that follow, like parts are typically marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness. Specific embodiments are described in detail and are shown in the drawings, with the understanding that the present disclosure is to be considered an exemplification of the principles of the invention, and is not intended to limit the invention to that illustrated and described herein. It is to be fully recognized that the different teachings of the embodiments discussed infra may be employed separately or in any suitable combination to produce desired results.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to . . . ". Reference to up or down will be made for purposes of description with "up," "upper," "upward," or "upstream" meaning toward the surface of the wellbore and with "down," "lower," "downward," or "downstream" meaning toward the terminal end of the well, regardless of the wellbore orientation. The term "zone" or "pay zone" as used herein refers to separate parts of the wellbore designated for treatment or production and may refer to an entire hydrocarbon formation or separate portions of a single formation such as horizontally and/or vertically spaced portions of the same formation. As used herein, "service" or "servicing" refers to any operation or procedure used to drill, complete, work over, fracture, repair, or in any way prepare or restore a wellbore for the recovery of materials residing in a subterranean formation penetrated by the wellbore. The various characteristics mentioned above, as well as other features and characteristics described in more detail below, will be readily apparent to those skilled in the art with the aid of this disclosure upon reading the following detailed description of the embodiments, and by referring to the accompanying drawings.

Referring now to FIG. 1A, an embodiment of a wellbore servicing apparatus 100 is shown in an operating environment. While the wellbore servicing apparatus 100 is shown and described with specificity, various other wellbore servicing apparatus embodiments consistent with the teachings herein are described infra. The wellbore servicing apparatus 100 comprises a drilling rig 106 that is positioned on the earth's surface 104 and extends over and around a wellbore 114 that penetrates a subterranean formation 102 for the purpose of recovering hydrocarbons. The wellbore 114 may be drilled into the subterranean formation 102 using any suitable drilling technique. The wellbore 114 extends substantially vertically away from the earth's surface 104 over a vertical wellbore portion 116, and in some embodiments may deviate at one or more angles from the earth's surface 104 over a deviated or horizontal wellbore portion 118. In alternative operating environments, all or portions of the wellbore may be vertical, deviated at any suitable angle, horizontal, and/or curved, and may comprise multiple laterals extending at various angles from a primary, vertical wellbore.

At least a portion of the vertical wellbore portion 116 may be lined with a casing 120 that is secured into position against the subterranean formation 102 in a conventional manner using cement 122. In alternative operating environments, the horizontal wellbore portion 118 may be cased and cemented and/or portions of the wellbore may be uncased (e.g., an open hole completion). The drilling rig 106 comprises a derrick 108 with a rig floor 110 through which a tubing or work string 112 (e.g., cable, wireline, E-line, Z-line, jointed pipe, coiled tubing, casing, or liner string, etc.) extends downward from the drilling rig 106 into the wellbore 114. The work string 112 delivers the wellbore servicing apparatus 100 to a predetermined depth within the wellbore 114 to perform an operation such as perforating the casing 120 and/or subterranean formation 102, creating a fluid path from the flow passage 142 to the subterranean formation 102, creating (e.g., initiating and/or extending) slots, perforation tunnels, and/or fractures (e.g., dominant/primary fractures, micro-fractures, etc.) within the subterranean formation 102, producing hydrocarbons from the subterranean formation 102 through the wellbore (e.g., via a production tubing or string), or other completion operations. The drilling rig 106 comprises a motor driven winch and other associated equipment for extending the work string 112 into the wellbore 114 to position the wellbore servicing apparatus 100 at the desired depth.

While the operating environment depicted in FIG. 1A refers to a stationary drilling rig 106 for lowering and setting the wellbore servicing apparatus 100 within a land-based wellbore 114, one of ordinary skill in the art will readily appreciate that mobile workover rigs, wellbore servicing units (such as coiled tubing units), and the like may be used to lower the wellbore servicing apparatus 100 into the wellbore 114. It should be understood that the wellbore servicing apparatus 100 may alternatively be used in other operational environments, such as within an offshore wellbore operational environment.

FIG. 1A illustrates a wellbore servicing apparatus 100 that may be used during production of the wellbore. As a result, the wellbore servicing apparatus 100 may remain in the well for extended periods of time while being removable for various servicing procedures as needed. The wellbore servicing apparatus 100 may comprise an upper end comprising a liner hanger 124 (such as a Halliburton VersaFlex® liner hanger), a lower end 128, and a tubing section 126 extending therebetween. The tubing section 126 may comprise a toe assembly 150 for selectively allowing fluid passage between flow passage 142 and annulus 138. The toe assembly 150 may comprise a float shoe 130, a float collar 132, a tubing conveyed device 134, and a polished bore receptacle 136 housed near the lower end 128. The components of toe assembly 150 (float shoe 130, float collar 132, tubing conveyed device 134, and polished bore receptacle 136) may be actuated by hydraulic shifting or mechanical shifting as necessary to allow fluid communication between flow passage 142 and annulus 138. In alternative embodiments, a tubing section may further comprise a plurality of packers that function to isolate formation zones (e.g., zones 2, 4, 6, 8, 10, 12) from each other along the tubing section. The plurality of packers may be any suitable packers such as swellpackers, inflatable packers, squeeze packers, production packers, or combinations thereof.

The horizontal wellbore portion 118 and the tubing section 126 define an annulus 138 therebetween. The tubing section 126 comprises an interior wall 140 that defines a flow passage 142 therethrough. In some embodiments, an inner string may be disposed in the flow passage 142 and the inner string may extend therethrough so that an inner string lower end connects to toe assembly 150. The float shoe 130, the float collar 132, the tubing conveyed devices 134, and the polished bore receptacle 136 of toe assembly 150 may be actuated by mechanical shifting techniques using the inner string as necessary to allow fluid communication between fluid passage 142 and annulus 138.

By way of a non-limiting example, six service assemblies 148 are connected and disposed in-line along the tubing section 126, and are housed in the flow passage 142 of the tubing section 126. Each of the formation zones 2, 4, 6, 8, 10, and 12 has a separate and distinct one of the six service assemblies 148 associated therewith. Each service assembly 148 can be independently selectively actuated to expose different formation zones 2, 4, 6, 8, 10, and/or 12 for servicing, stimulation, and/or production (e.g., flow of a wellbore servicing fluid from the flow passage 142 of the work string 112 to the formation and/or flow of a production fluid to the flow passage 142 of the work string 112 from the formation) at different times. In this embodiment, the service assemblies 148 are ball drop actuated. In alternative embodiments, the service assemblies may be mechanical shift actuated, mechanically actuated, hydraulically actuated, electrically actuated, coiled tubing actuated, wireline actuated, or combinations thereof to increase or decrease a fluid path between the interior of service assemblies and the associated formation zones (e.g., by opening and/or closing a window or sliding sleeve). In alternative embodiments, the service assemblies may be any suitable service assemblies.

In an embodiment, the service assemblies 148 may each comprise a housing with one or more nozzles 200 associated therewith. The service assemblies 148 may be configured to be directly connected to or threaded into a tubing section such as tubing section 126 (or in alternative embodiments of a wellbore servicing apparatus, to other service assemblies). In some embodiments, the service assemblies 148 may comprise suitable structures (e.g., windows and/or sliding sleeves) for selective actuation of the service assembly.

Figure 1B:
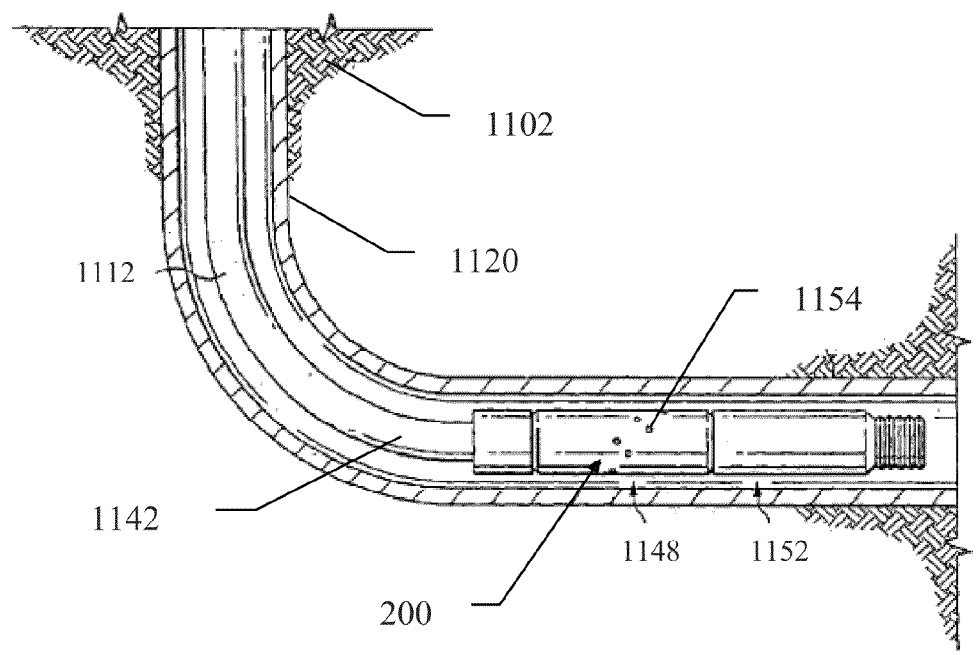
FIG. 1B is a simplified cross-sectional view of an embodiment of a wellbore servicing apparatus in a wellbore.

In another embodiment shown in FIG. 1B, an assembly for servicing a well is illustrated in the lower portion of a wellbore. This assembly may be used to service a wellbore and may be removed prior to production of one or more fluids from the well. This assembly may be used in any of the operating environments described with respect to FIG. 1A. In the embodiment shown in FIG. 1B, one end of the work string 1112 may be connected to one end of a tubular jet sub 1148. The jet sub 1148 may comprise a tubular housing that includes a longitudinal flow passage coupled to the flow passage 1142 extending through the length of the housing. The jet sub 1148 may have a plurality of openings 1154 machined through its wall that form nozzles as described in more detail below. Alternatively, a plurality of openings 1154 may be machined through the wall of the jet sub 1148 and may be adapted to receive one or more suitable nozzles as described in more detail below. The openings 1154 containing the nozzles may extend through the wall of the casing 1120 in one plane and can extend perpendicular to the axis of the casing 1120, at an acute angle to the axis of the casing 1120, and/or aligned with the axis.

The lower end of the jet sub 1148 may have one or more additional components coupled thereto. In an embodiment, a valve sub 1152 may be connected to the other end of the jet sub 1148 for use in controlling the flow of fluid through the work string 1112. The valve sub 1152 may normally be closed to cause flow of fluid to discharge from the jet sub 1148. The valve sub 1152 may be used to allow for emergency reverse circulation processes, such as during screenouts, equipment failures, etc. Additional suitable components may be coupled to the jet sub 1148 and/or the valve sub 1152 such as any other components that may be used in the wellbore servicing process including sensors, recorders, centralizers, and the like. In addition, it is understood that other conventional components, such as centering devices, blow out preventers, strippers, tubing valves, anchors, seals etc. can be associated with the work string 1112 of FIG. 1B.

An annulus is formed between the inner surface of the casing 1120 and the outer surfaces of the work string 1112 and the jet sub 1148 and the valve sub 1152. Several different types of fluids may be pumped through the flow passage 1142 and out to the formation through the subs and the annulus. In order to treat the formation, the casing 1120 in the interval of interest must be either pre-perforated or perforated using conventional means; or it could be hydrajetted with sand using the jet sub 1148. Optionally, inside the casing section wire screens could be installed and packed with gravel in a manner well known in the art. The jet sub 1148 comprising the nozzles may then be activated by passing a fluid through the interior flow passage 1142 of the work string 1112, as described in more detail below.

Figure 2:
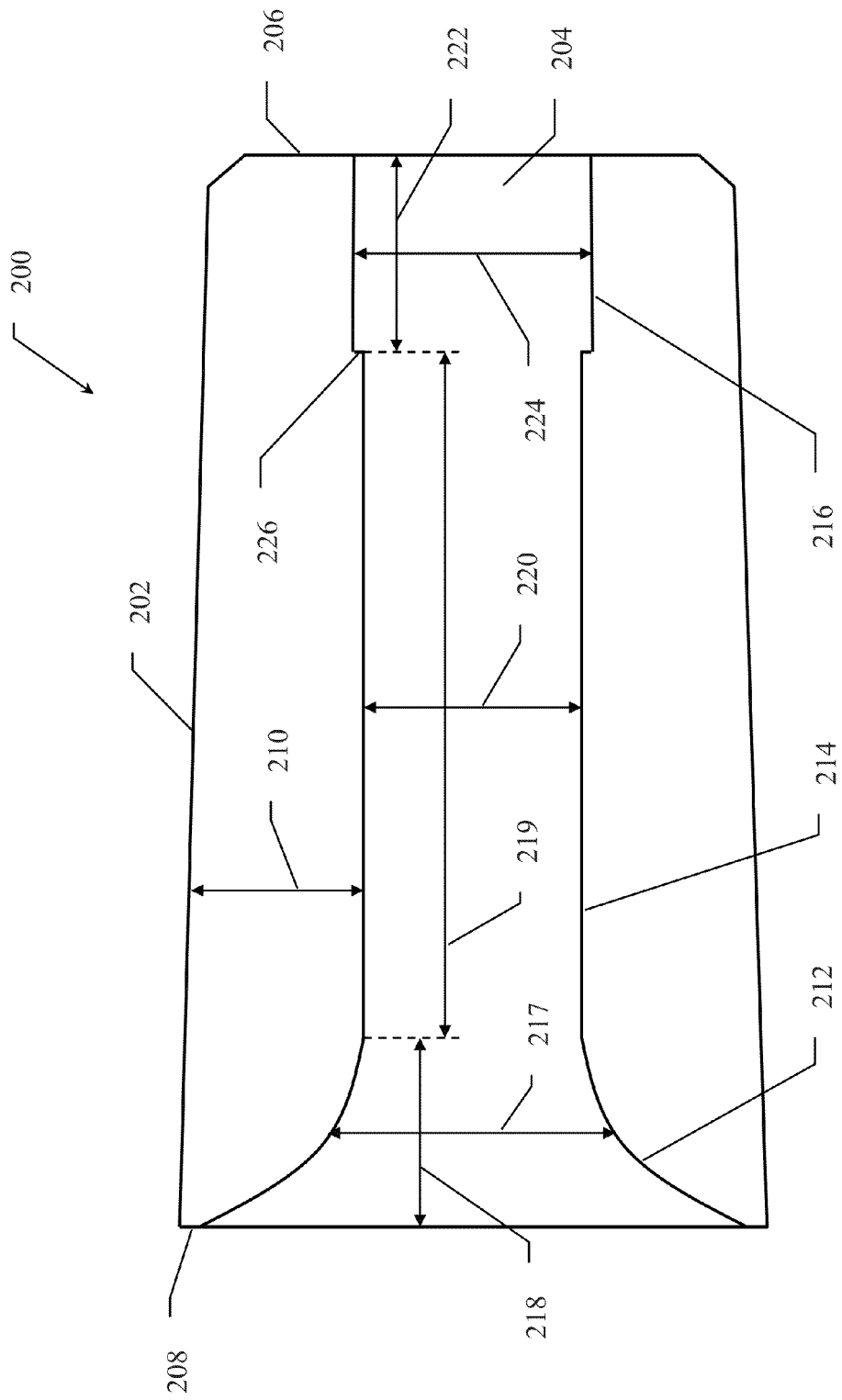
FIG. 2 is a cross-sectional view of an embodiment of a nozzle.

Irrespective of the type of work string, assembly, and/or tool in which the nozzle 200 of FIG. 2 is used, it will be appreciated that the nozzle 200 is configured to serve multiple functions. One function of the nozzle 200 is to increase the velocity of a fluid as it passes through the nozzle 200 to the formation. The nozzle 200 may be configured to restrict fluid flow and thus increase the fluid velocity (e.g., jetting the fluid) as the fluid passes through the nozzle 200. The jetted fluid may be jetted at a sufficient fluid velocity so that the jetted fluid can ablate and/or penetrate the lining (e.g., casing, cement, etc.) and/or the subterranean formation, thereby forming slots (e.g., eroded slots), perforation tunnels, micro-fractures, and/or extended fractures in the lining and/or subterranean formation. The jetted fluid may be flowed through the nozzle 200 for a jetting period to form a slot and/or perforation tunnel, micro-fractures, and/or extended fractures within the formation as described infra. Generally, the velocity of a jetted fluid is greater than 300 feet per second (ft/sec).

Referring to FIG. 2, the nozzle 200 is shown in greater detail. The nozzle 200 may generally form a portion of a flow device such as a jetting device. The nozzle 200 comprises a generally cylindrical body 202 defining an interior flowpath 204. The nozzle comprises an outer end 206 that faces the formation zone of interest and an inner end 208 that faces the flow passage 142. The outer diameter of the body 202 is configured to complement and be received and held within a port in the service assembly housing. The thickness 210 of body 202 may be adjusted depending on the need of the process and may be determined by one of ordinary skill in the art with the aid of this disclosure. The outer end 206 of the body may be beveled for ease of insertion into the port in the housing. In an embodiment, the diameter of the body 202 may narrow between the inner end 208 and the outer end 206 so that the body has an overall wedge or conical shape. This shape may aid in maintaining the nozzle 200 within the port in the housing and/or maintaining sealing engagement of the nozzle 200 in the port to prevent channeling of fluid around the nozzle 200 upon the application of pressure to the flow passage 142 (as shown in FIG. 1A).

The body 202 of the nozzle 200 may be constructed of any suitable materials. In an embodiment, the body 202 may be constructed of an abrasion and/or erosion resistant material. Suitable abrasion and/or erosion resistant materials may comprise matrix materials such as carbide particles in a metal matrix (e.g., tungsten carbide by itself or in a metallic binder, such as cobalt, tin, and/or nickel), ceramics, erosion resistant metals and alloys (e.g., tungsten carbide), and combinations thereof. In some embodiments, the nozzle 200 may only be needed for a limited time. In these embodiments, the body 202 may be constructed of a material that can be removed through degradation, abrasion, erosion, mechanical removal, etc. For example, the body 202 may be constructed of water soluble materials (e.g., water soluble aluminum, biodegradable polymer such as polylactic acid, etc.), acid soluble materials (e.g., aluminum, steel, etc.), thermally degradable materials (e.g., magnesium metal, thermoplastic materials, composite materials, etc.), or combinations thereof. The interior flowpath 204 is positioned within the body 202 to provide fluid communication between the flow passage 142 adjacent the inner end 208 and the formation adjacent the outer end 206. The interior flowpath 204 may be positioned concentrically within the body 202 and may be cylindrical in shape, however, in some embodiments, the shape of the interior flowpath may vary to some degree. The diameter of the interior flowpath 204 may be chosen to provide the desired fluid flow rate and fluid velocity at the appropriate operating conditions (e.g., pressure, temperature, etc.) and wellbore service fluid types (e.g., particulate type and/or concentration, fluid viscosity, fluid composition, etc.).

As shown in FIG. 2, the body 202 may be configured to provide several distinct flow portions of the interior flowpath 204. For example, the interior flowpath 204 may comprise an inlet section 212, a flow section 214, and an expansion section 216. Nozzle 200 may be integrally formed from a single body 202 portion, although it will be appreciated by one of ordinary skill in the art that the various sections of the nozzle 200 may be contained in separate components that are coupled together. Fluid flowing from the flow passage 142 may first flow through the inlet section 212, which is optional. The inlet section 212 may have a decreasing diameter 217 along its length 218 between the inner end 208 of the body 202 and the interface with the flow section 214. The diameter 217 may decrease gradually (e.g., over a curved surface) or may decrease in one or more steps, which may correspond to one or more sharp edges. In an embodiment, the diameter 220 of the flow section 214 may extend to the inner edge 208 of the nozzle 200, in which case the inlet section 212 may not be considered to be present. The flow section 214 may have a relatively uniform diameter 220 along its length 219. The diameter of the expansion section 216 is greater than the diameter 220 of the flow section 214 and may be relatively uniform along its length 222. The expansion section 216 extends to the outer edge 206 of the nozzle 200.

The diameter 220 of the flow section 214 is less than the diameter 224 of the expansion section 216, thereby creating a shoulder 226 at the intersection of the flow section 214 and the expansion section 216. The shoulder 226 may be formed as an edge disposed perpendicular to the central longitudinal axis of the interior flowpath 204. In an embodiment, the shoulder may be formed of a generally flat edge that may be tilted up to about 30 degrees from a plane perpendicular to the longitudinal axis of the interior flowpath 204. In an embodiment, the shoulder 226 may comprise one or more rounded edges or surfaces to allow the shoulder to extend from the diameter 220 of the flow section 214 to the diameter 224 of the expansion section 216 over a short distance.

In an embodiment, the diameters and lengths of the inlet section 212, the flow section 214, and/or the expansion section 216 may vary depending on the particular application in which the nozzle 200 is used. In a wellbore servicing operation, the length 219 of the flow section 214 may be greater than about three times its diameter 220, alternatively greater than about four times its diameter 220. The diameter 220 of the flow section 214 may be measured as the minimum diameter of the flow section 214 when the diameter 220 varies over the length 219 of the flow section 214. The length 218 of the inlet section 212 may be less than about 2 times the diameter 220 of the flow section 214. The length 222 of the expansion section 216 may range from about one half of the diameter 220 of the flow section 214 to about four times the diameter 220 of the flow section 214 taking into account the need for the expanding fluid to contact the edge of the expansion section 216 prior to the outer edge 206 as described in more detail infra. In an embodiment, the diameter 224 of the expansion section 216 may be about 1.01 to about 1.5 times the diameter 220 of the flow section 214. In an embodiment, the overall length (i.e., the sum of lengths 218, 219, and 222) of the nozzle 200 may be about 0.5 inches to about 6 inches, alternatively about 0.75 to about 4 inches. The diameter of the flow section 214 may be about 0.05 inches to about 2 inches, alternatively about 0.2 inches to about 1 inch. Referring to FIGS. 2 and 3, the fluid flow through interior flowpath 204 expands into the expansion section 216 in a conical stream after passing through the flow section 214 over shoulder 226.

Figure 3A:
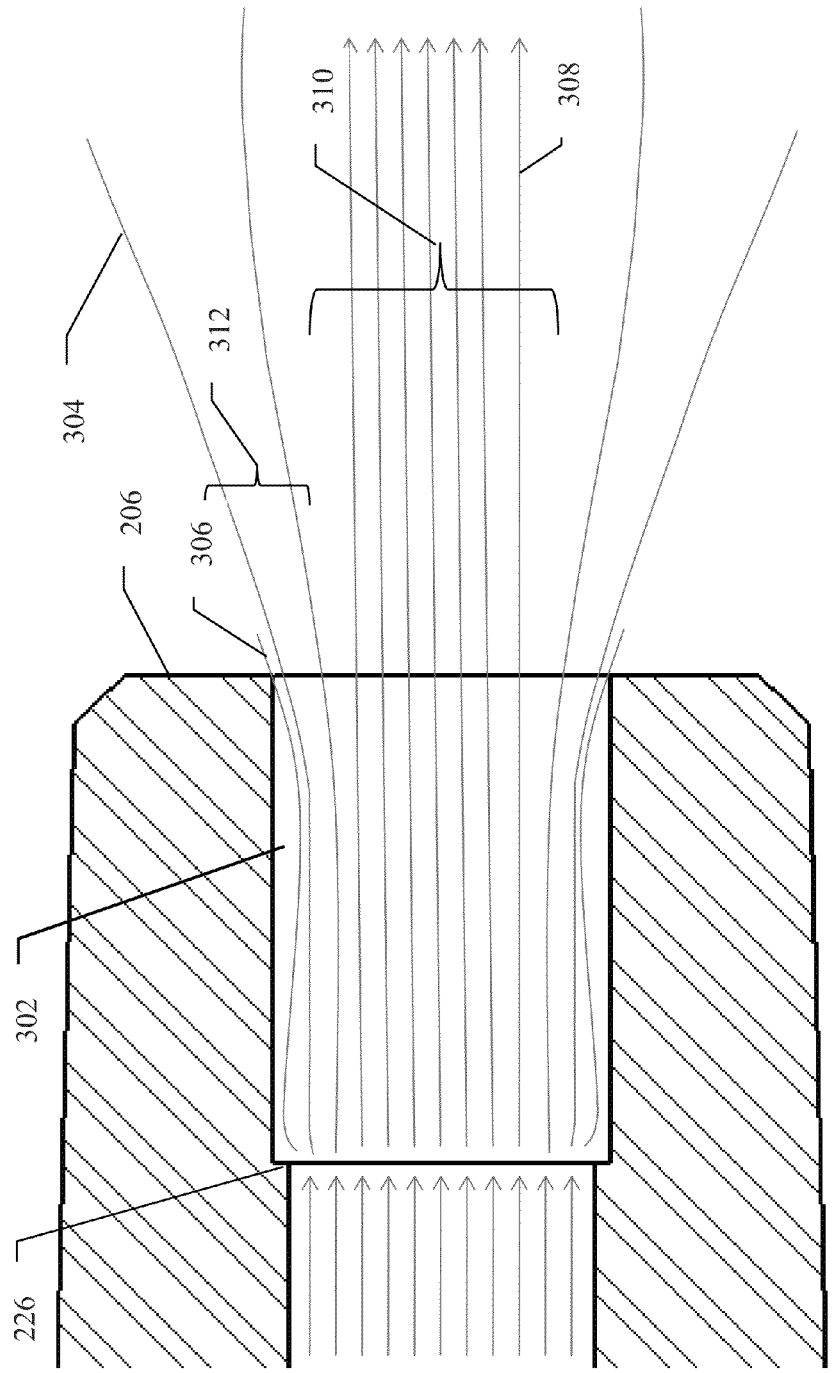
FIGS. 3A and 3B are schematic flow diagrams of embodiments of a fluid flow through a nozzle.

Without intending to be limited by theory, it is believed that the fluid stream formed by fluid passing through the nozzle 200 will generally form a conical stream following stream lines shown in FIG. 3A, such as stream lines 304, 306, and 308. The fluid stream may naturally expand due to the interaction or friction between the fluid stream and the fluid inside the interior flowpath 204, which may slow down the outer skin of fluid in the fluid stream. This slowing may result in the slight expansion of the fluid stream. This natural expansion of the fluid may be used to design the interior flow path diameter 224, which may be selected so that the outer diameter of the outer skin 304 of the fluid stream is slightly smaller than the interior flow path diameter 224 when the stream leaves the tip section 206. The natural expansion of the fluid through the expansion section 216 varies between about 0.5 degrees and 3 degrees as measured at the edge of the flow section 214 in a direction parallel to the longitudinal axis of the interior flowpath 204. In an embodiment, the expansion section 216 diameter 224 and length 222 may be configured to ensure that the diameter 224 is slightly larger than the diameter of the fluid stream 304 at the outer end 206 of the nozzle. This way, the original outer fluid stream 304 may pull fluid by means of friction out of chamber 302 to create a new flow stream 306 originating from chamber 302. As a result, a region of pressure below the pressure present outside of outer end 206 may be created in chamber 302. The region of reduced pressure may pull fluid into it from resources such as the jet stream itself, the fluid upstream of outer edge 206 (e.g., within flow passage 142), and/or fluid downstream of the outer edge 206. In other words, if the length 222 and diameter 224 of the expansion section 216 are configured such that a diameter of a fluid stream discharged from the nozzle 200 (i.e. the diameter of the flow stream 306) is slightly less than the diameter 224 of the expansion section 216 at the outer end 206 of the nozzle 200, then any bulk backflow of fluid outside of the nozzle 200 into the expansion section 216 is substantially inhibited when fluid is flowing through the nozzle 200.

Figure 3B:
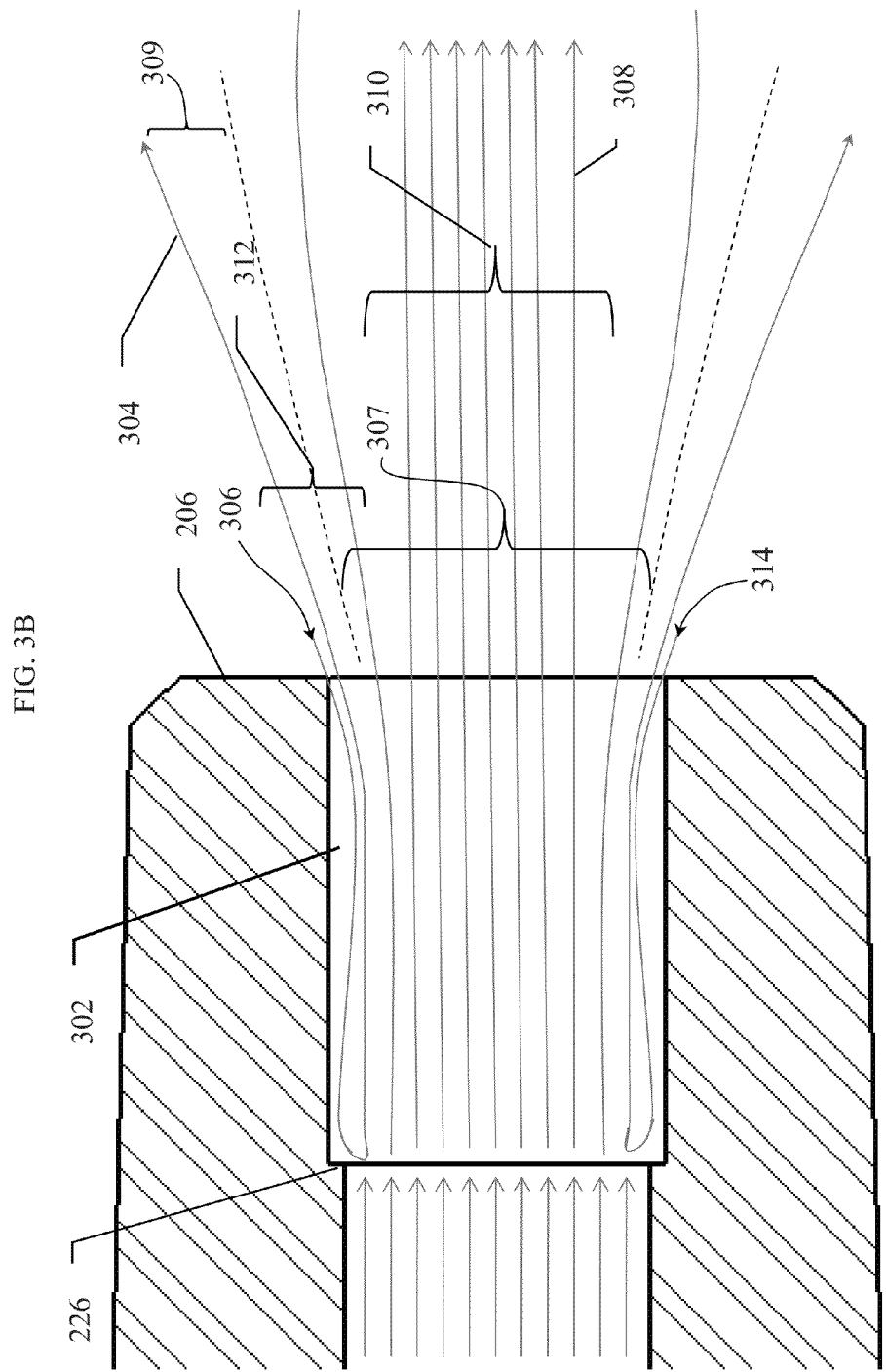

In an embodiment as illustrated in FIG. 3B, a portion of a fluid adjacent the outer end of the nozzle may flow back into the nozzle. Without intending to be limited by theory, it is believed that the selection of the diameter 224 as being slightly greater than the diameter of the flow stream 307 (e.g., where flow stream 307 originates from upstream of the shoulder 226) at the discharge from the nozzle may allow some amount of fluid downstream 314 of the outer edge 206 to flow back into the chamber 302. The amount of fluid is expected to be relatively small as compared to amount of fluid flowing through the nozzle. For example, the amount of fluid downstream of the outer edge 206 flowing back into the chamber may be less than about 15%, less than about 10%, or less than about 5% of the amount of fluid flowing through nozzle. The flowback from the downstream region may be created by the creation of the low pressure region (e.g., a vacuum region) created by the sudden expansion at the shoulder 226. Fluid that is pressurized by the hydrostatic pressure adjacent the outer end 206 may be pushing into the cavity. The fluid may then reverse flow direction to be directed outward, thereby pushing the incoming fluid and a portion of the fluid flowing through the nozzle back out (e.g., along backflow stream line 309). This inflow and outflow may carry the fluid flowing through the nozzle (e.g., fluid flowing along flow stream 307) outward at a greater speed as compared to a nozzle without any backflow. Just as a sabot used for launching a missile, the backflow flowing along stream line 309 may act as a virtual sabot that drives and/or carries the fluid flowing along flow stream 307 with less friction. Flow stream 307 may then flow faster under the same pressure differential as compared to a nozzle without any backflow, thereby increasing the $C_d$ (coefficient of discharge) as described in more detail herein. In an embodiment, backflow may allow the nozzle to have a coefficient of discharge greater than 1.0. The fluid flowing back into the chamber 302 may determine the pressure within the edge of the expansion section 216 (e.g., in the chamber 302). In general, it is expected that the larger the backflow of the fluid downstream of the nozzle 200 into the chamber 302, the greater the absolute pressure within the chamber will be (e.g., the vacuum effect will be less within the chamber 302). This may represent a form of a suction break within the chamber 302. Further, the fluid flowing into the chamber 302 will be entrained by the fluid flowing through the nozzle due to drag, thereby carrying any fluid entering the chamber 302 from downstream of the nozzle 200 out of the nozzle 200.

Without intending to be limited by theory, the resulting pressure change within the chamber due to the backflow of fluid from downstream of the nozzle 200 may be thought of as a use of the downstream fluid energy to form and/or power the fluid stream flowing through the nozzle 200. In other words, the reduction in the vacuum pressure effect in the chamber acting against the flow of fluid through the nozzle once it passes the chamber may be reduced. This reduction may be based on an energy input in the form of pressure from the ambient environment downstream of the nozzle. The amount of pressure supplied to the chamber from the downstream environment may vary, and in an embodiment, may be at least about 10%, at least about 20%, at least about 30%, at least about 40%, or at least about 50% of the downstream ambient pressure. In an embodiment, the amount of pressure supplied to the chamber from the downstream environment may be less than about 80%, less than about 70%, or less than about 60% of the downstream ambient pressure. The design of the nozzle including the relative lengths 219, 222 and diameters 220, 224 may be selected to provide the desired amount of backflow into the chamber 302, and thereby the amount of pressure input available from the ambient environment downstream of the nozzle 200. Since the flowrate of the fluid stream through the nozzle 200 is based on the pressure differential across the nozzle 200, the resulting decrease in pressure due to the expansion section 216 may result in a higher fluid flowrate through the nozzle 200. Alternatively, a decreased pressure may be used to generate an equivalent fluid flowrate through the nozzle 200 as compared to a nozzle without the expansion section 216 as described herein. While the chamber 302 results in a decreased pressure, it is not expected that any cavitation would occur within the chamber 302, and in an embodiment, no cavitation of the fluid occurs within the expansion section 216. In an embodiment, any combination of increased flowrate and/or decreased pressure may be achieved between these two limits.

In an embodiment, the use of the expansion section 216 as described herein may result in a pressure drop within the expansion section 216 of greater than about 10%, alternatively greater than about 20%, alternatively greater than about 30%, or alternatively greater than about 40% as compared to the pressure at the outer edge of a nozzle not having an expansion section 216. In an embodiment, the use of an expansion section 216 in the nozzle 200 and a constant fluid supply pressure may result in an increased flowrate of fluid through the nozzle 200 of greater than about 10%, alternatively greater than about 20%, alternatively greater than about 30%, or alternatively greater than about 40% as compared to a nozzle not comprising an expansion section 216. The corresponding decrease in pressure may allow smaller pumps and/or a reduced power input to the pumps to be used during a workover operation and/or a higher volume of fluid to be passed through the nozzles with the same pumping units.

The use of the expansion section 216 and the resulting chamber 302 may allow the coefficient of discharge of the nozzle 200 to be increased to greater than about 1.0. The coefficient of discharge relates the relative stream diameter of an exiting stream to the fluid stream within the nozzle along with the relative velocity profile of the stream at the location where the exiting diameter is measured. In general, a stream exiting a nozzle decreases in response to the pressure profile over the cross-section of the fluid stream, which generally has a higher velocity, and a corresponding lower pressure, at its core (e.g., section 310) as compared to its outer edges (e.g., section 312). In general, the Coefficient of Discharge ($C_d$) can be computed by the following relationship:

$$C_d = \frac{Q}{A\sqrt{\frac{2\Delta P}{\rho}}} \quad \text{(Eq. 1)}$$

where Q is flow rate, A is the area base upon the smallest inner diameter 220 of the jet, $\rho$ is the fluid density, and $\Delta P$ is pressure differential across jet 200. In an embodiment, the use of the expansion section 216 may allow the nozzle 200 to achieve a coefficient of discharge of greater than 1.0, alternatively greater than about 1.1, alternatively greater than about 1.2, or alternatively greater than about 1.3.

Due to the decreased pressure differential across the nozzle 200, the resulting fluid stream exiting the nozzle 200 may seem to expand in a wider cone than a comparable stream from a nozzle not comprising an expansion section 216. For example, the fluid velocity of the outer edge of the flowstream may have a decrease in velocity of about 5% to about 20% relative to a nozzle not comprising the expansion section 216. The core of the flow stream, however, may have the same velocity as a nozzle without the expansion section 216. In other words, for an equivalent pressure drop across the nozzles, the core velocity may increase 3% to 6% for the nozzle comprising the expansion section 216, thereby increasing cutting efficiency. While not intending to be limited by theory, it is theorized that, as shown in FIG. 3, most flaring may involve fluid that originated from the backflow from the downstream fluid. This represents an equivalent energy conversion for a nozzle with and without the expansion section 216. While this may result in a more rapid drop-off in the velocity of the outer edge fluid, for an energy balance condition, it is believed that the velocity of the fluid core 310 may increase in order to maintain the energy balance, at least over a sufficient distance to ablate and/or penetrate the formation. Accordingly, an overall advantage can be realized in the form of an unexpected decrease in the pressure requirements and/or an increased fluid flowrate with only a decrease in the fluid velocity of a small portion of the fluid exiting the nozzle 200.

The nozzle may be operated by providing a fluid to the inner end 208 and allowing the fluid to flow through the interior flowpath 204 and exit the outer end 206. The fluid entering the nozzle 200 is at a higher pressure than the ambient pressure adjacent the outer edge 206 of the nozzle, thereby allowing the fluid to flow through the nozzle 200. Upon initiation of flow through the nozzle 200, the fluid may expand out of the flow section 214, past shoulder 226, and flow in a conical flow pattern into the expansion section 216. Due to the conical flow pattern touching or almost touching the walls of the body 202 in the expansion section 216, fluid from outside of the nozzle 200 is reduced or prevented from flowing into the expansion section 216. A chamber 302 may then be formed with a pressure below that of the ambient pressure outside the outer edge 206 of the nozzle. In some embodiments, some amount of backflow may be allowed into the nozzle (e.g., into the chamber 302) to affect the pressure in the chamber 302, as described in more detail herein. The resulting fluid flow through the nozzle 200 may experience a decreased pressure drop and/or an increased flowrate through the nozzle 200. Further, the nozzle 200 may have a coefficient of discharge greater than 1.0.

In an embodiment, the nozzle 200 may be used in a service tool to service a wellbore 114. Generally, servicing a wellbore 114 may be carried out for a plurality of formation zones (as shown in FIG. 1) starting from a formation zone in the furthest or lowermost end of the wellbore 114 (i.e., toe) and sequentially backward toward the closest or uppermost end of the wellbore 114 (i.e., heel). Referring to FIG. 1, the wellbore servicing may begin by disposing a liner hanger comprising a float shoe and a float collar disposed near the toe, and a tubing section 126 comprising a plurality of service assemblies 148 comprising a nozzle 200 as described with respect to FIGS. 2 and 3. The service assembly 148 may be positioned adjacent the formation zone to be treated. While the orientation of the service assembly 148 is illustrated as being horizontal, in alternative methods of servicing a wellbore, the service assembly may be deviated, vertical, or angled, which can be selected based on the wellbore conditions. Prior to servicing of the wellbore, cementing of the wellbore may be performed via the float shoe and collar. In an embodiment, the service assembly 148 may initially be in a closed position wherein there is no fluid communication between the flow path 142 and the formation zone 12, and may be subsequently opened using any methods known to one of ordinary skill in the art with the aid of this disclosure. For example, the service assembly 148 may be actuated by hydraulically applying pressure, by mechanically, or electrically shifting a sleeve to move sleeve ports and the annular gap.

An abrasive wellbore servicing fluid (such as a fracturing fluid, a particle laden fluid, a cement slurry, etc.) may then be pumped down the wellbore 114 into the flow path 142 and through one or more nozzles 200. In an embodiment, the wellbore servicing fluid is an abrasive fluid comprising from about 0.5 to about 1.5 pounds of abrasives and/or proppants per gallon of the mixture (lbs/gal), alternatively from about 0.6 to about 1.4 lbs/gal, alternatively from about 0.7 to about 1.3 lbs/gal. As the abrasive wellbore servicing fluid is pumped down and passed through the interior flowpath 204 of the nozzle 200, a fluid jet is formed. Generally, the abrasive wellbore servicing fluid is pumped down at a sufficient flow rate and pressure to form a fluid jet through the nozzles 200 at a velocity of from about 50 to about 2700 feet per second (ft/s), alternatively about 300 to about 2000 ft/sec, alternatively from about 350 to about 1000 ft/sec, alternatively from about 400 to about 600 ft/sec for a period of from about 2 to about 10 minutes, alternatively from about 3 to about 9 minutes, alternatively from about 4 to about 8 minutes at a suitable original flow rate as needed by the service process. The pressure of the abrasive wellbore servicing fluid may be increased from about 2000 to about 5000 psig, alternatively from about 2500 to about 4500 psig, alternatively from about 3000 to about 4000 psig and the pumping down of the abrasive wellbore servicing fluid is continued at a constant pressure for a period of time. In an embodiment, the use of one or more nozzles 200 as described herein may reduce the pressure requirements by greater than about 10%, alternatively greater than about 20%, alternatively greater than about 30%, or alternatively greater than about 40%.

At the end of the jetting period, the fluid jets may have eroded the lining and/or formation zone to form slots and/or perforation tunnels (and optionally micro-fractures and/or extended fractures depending upon the treatment conditions and formation characteristics) within the lining and/or formation zone. If needed, the flow rate of the abrasive wellbore servicing fluid may be increased typically to less than about 4 to 5 times the original flow rate to form slots and/or perforation tunnels of a desirable size and/or geometry. The formation of slots and/or perforation tunnels may be desirable when compared to multiple fractures. Typically, slots and/or perforation tunnels lead to the formation of dominant/extended fractures, which provide less restriction to hydrocarbon flow than multiple fractures, and increase hydrocarbon production flow into the wellbore 114.

In an embodiment, the nozzle 200 and/or one or more additional components of the service tool may be removed. For example, the nozzle 200 and/or one or more additional components may be removed by continued abrasion by flow of the abrasive wellbore servicing fluid and/or by degradation such as contacting the nozzle 200 and/or one or more additional components with an acid that degrades nozzle 200 and/or one or more additional components. The abrasive fluid and/or degradation fluid (e.g., acid) may be pumped down the flow path 142 for a sufficient time to completely (or partially) remove the nozzle 200 and/or one or more additional components. In alternative embodiments, the nozzle 200 and/or one or more additional components may be removed by any suitable method, for example, by mechanically removing the nozzle 200 and/or one or more additional components using coiled tubing or other devices or methods. Such actions may aid the wellbore service by increasing the area available for fluid flow through the tool and into the formation.

In an embodiment, the abrasive fluid may be displaced with another wellbore servicing fluid (for example, a proppant laden fracturing fluid that may or may not be similar to the abrasive wellbore servicing fluid) and the wellbore servicing fluid may be pumped through the nozzles 200 and/or additional apertures in the service assembly to form and extend dominant fractures in fluid communication with the slots and/or perforation tunnels. The dominant fractures may expand further and form micro-fractures in fluid communication with the dominant fractures. Generally, the dominant fractures expand and/or propagate from the slots and/or perforation tunnels within the formation zone to provide easier passage for production fluid (i.e., hydrocarbon) to the wellbore 114. Once the fractures are formed and extended, hydrocarbons can be produced by flowing the hydrocarbons from the micro-fractures (if present), to the dominant fractures, to the slots and/or perforation tunnels, and into the service assembly.

The number of intervals or zones, the order in which the service assemblies comprising the nozzles described herein are used (e.g., partially and/or fully opened and/or closed), the service assemblies, the wellbore servicing fluid, etc. shown herein may be used in any suitable number and/or combination and the configurations shown herein are not intended to be limiting and are shown only for example purposes. Any desired number of formation zones may be treated or produced in any order.

In another embodiment, the work string 1112 of FIG. 1B may be used to service a wellbore. In connection with formations in which the wellbores extend for relatively long distances, either vertically, horizontally, or angularly, the jet sub 1148, the valve sub 1152, and the workstring 1112 can be initially placed at the toe section (i.e., the farthest section from the ground surface) of the well. Treatment of the subterranean formation 1102 using one or more servicing fluids may be carried out in intervals and repeated numerous times throughout the wellbore section (e.g., such as every 100 to 200 feet).

Referring to FIG. 1B, the wellbore servicing may begin by disposing the work string 1112 comprising the valve sub 1152 and the jet sub 1148, which comprises a nozzle 200 as described with respect to FIGS. 2 and 3. The jet sub 1148 may be positioned adjacent the formation zone to be treated. While the orientation of the work string 1112 is illustrated as being horizontal, in alternative methods of servicing a wellbore, the work string 1112 may be deviated, vertical, or angled, which can be selected based on the wellbore conditions. In an embodiment, the valve sub 1152 may initially be in an open position so that fluid flow is directed out of the work string 1112 rather than through the nozzle 200. The valve sub 1152 may be subsequently closed using any methods known to one of ordinary skill in the art with the aid of this disclosure. For example, a ball or dart may be dropped into the work string 1112, pass through the jet sub 1148, and seat on a shoulder within the valve sub 1152. One or more servicing fluids may be pumped down the work string 1112 to form a jet through the nozzle 200 for treating the subterranean formation 1102. For example, the various fluids may comprise a preflush fluid, a servicing or stimulation fluid, an afterflush fluid, and/or a diversion fluid. In some embodiments, the servicing fluid may comprise a foamed fluid and/or the servicing fluid may be foamed through the introduction of gas through the work string 1112.

In some embodiments, an initial fluid comprising an abrasive material may be used to form one or more passages in the casing 1120 and/or the subterranean formation 1102 to allow the other fluids to reach the subterranean formation 1102. In an embodiment, the fluid may comprise an abrasive fluid comprising from about 0.5 to about 1.5 pounds of abrasives and/or proppants per gallon of the mixture (lbs/gal), alternatively from about 0.6 to about 1.4 lbs/gal, alternatively from about 0.7 to about 1.3 lbs/gal. As the abrasive wellbore servicing fluid is pumped down and passed through the jet sub 1148 and the nozzle 200, a fluid jet is formed. Generally, the abrasive wellbore servicing fluid is pumped down at a sufficient flow rate and pressure to form a fluid jet through the nozzles 200 at a velocity of from about 50 to about 2700 feet per second (ft/s), alternatively about 300 to about 2000 ft/sec, alternatively from about 350 to about 1000 ft/sec, alternatively from about 400 to about 600 ft/sec for a period of from about 2 to about 10 minutes, alternatively from about 3 to about 9 minutes, alternatively from about 4 to about 8 minutes at a suitable original flow rate as needed by the service process. The pressure of the abrasive wellbore servicing fluid may be increased from about 30 to 50,000 psig, alternatively from about 2000 to about 10,000 psig, alternatively from about 2500 to about 5000 psig, alternatively from about 3000 to about 4000 psig and the pumping down of the abrasive wellbore servicing fluid is continued at a constant pressure for a period of time. At the end of the jetting period, the fluid jets may have eroded one or more passages in the casing 1120.

In an embodiment, a preflush fluid may be pumped down the work string 1112 and/or the annulus at pressures between the pressure of the pores of the formation and the fracture pressure. The preflush fluid can be non-acidic, acidic, or both. The preflush fluid may pass through the jet sub 1148 to form a fluid jet directed at the subterranean formation 1102.

A stimulation fluid may then pumped through the work string 1112 at pressures between the pore pressure and the fracture pressure. In some embodiments, the stimulation fluid may be pumped through the work string 1112 and the nozzle 200 at pressures above the fracture pressure of the formation. The stimulation fluid may comprise a conventional acid that is used in squeezing or matrix acidizing, along with various additives that are well known in the art. Typical acids may include, but are not limited to, mineral or organic acids, such as hydrochloric acid, hydrofluoric acid, formic acid, or acetic acid, or a blend thereof. The stimulation fluid may react with the subterranean formation 1102 to cause fracturing and squeezing, in a conventional manner.

Generally, the servicing fluids may be pumped down the work string 1112 at a sufficient flow rate and pressure to form a fluid jet through the nozzle 200. For example, the stimulation fluid may be pumped through the work string 1112 and out of the nozzle 200 in the jet sub 1148 to form a jet with a velocity of from about 50 to about 2700 feet per second (ft/s), alternatively about 300 to about 2000 ft/sec, alternatively from about 350 to about 1000 ft/sec, alternatively from about 400 to about 600 ft/sec. The stimulation fluid may be pumped out of the nozzles for a period sufficient to treat the interval of interest. In an embodiment, a suitable treatment period may range from about 2 to about 20 minutes, alternatively from about 3 to about 15 minutes, alternatively from about 4 to about 8 minutes at a suitable original flow rate as needed by the service process.

An afterflush fluid may then pumped down the work string 1112 and/or annulus to sweep the stimulation fluid out of the wellbore. This afterflush fluid is generally non-acidic. After a predetermined pumping of the afterflush fluid, a diversion stage may be initiated to insure that the fluid is spread over a relative large surface area of the subterranean formation 1102. Once the desired treatment of an interval is accomplished, the above steps may be repeated in another interval. The work string 1112 may then be removed from the wellbore and fluid can be recovered from the well. The fluid may comprise both the servicing fluid and hydrocarbons from the subterranean formation 1102.

While the nozzle 200 has been described herein in the context of a subterranean formation and a well, the design of the nozzle 200 may be applied to a variety of industrial settings where a high velocity fluid stream is desired with a reduced pressure or pumping requirements and/or improved flowrate or fluid velocity requirements. For example, a similar design to the nozzle 200 may be used in a valve seat (e.g., a ball valve seat), a pump valve, an exhaust pipe, a launch tube (e.g., a firearm barrel, submarine launch tube, etc.), an aircraft engine, a jetting device (e.g., in with an apparatus for industrial cleaning such as the industrial cleaning of hydrocarbon production equipment, car washes, yard work, etc.), power boosters (e.g., compressors, turbochargers, etc.), jet steering/propulsion devices in boats and/or ships, and the like.

Figure 4:
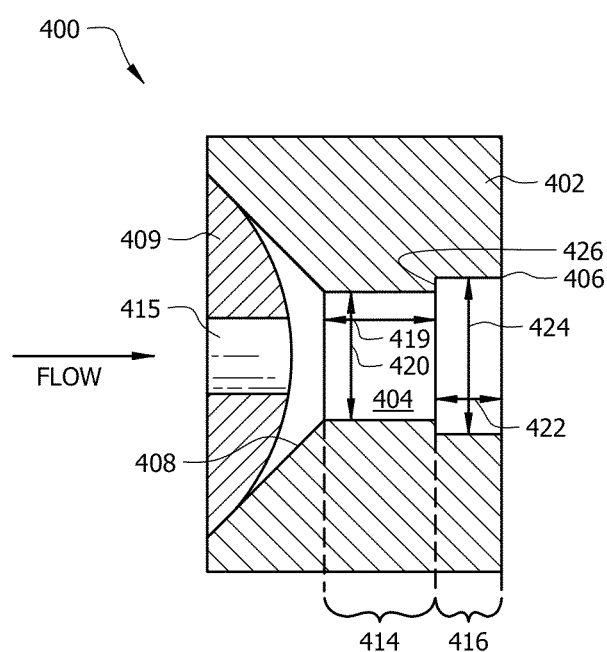
FIG. 4 is a schematic cross-sectional view of an embodiment of a valve.

In an embodiment as shown in FIG. 4, a valve seat 400 for a ball valve is illustrated. As illustrated, the valve seat 400 is configured similarly to the nozzle 200. The valve seat 400 comprises a body 402 defining an interior flowpath 404. The valve seat 400 comprises a first end 408 and a second end 406, wherein the first end 408 may be configured to receive a sealing element such as a ball 409. The first end 408 may comprise one or more seats for engaging and forming a sealing engagement with the ball 409. In general, the ball 409 may comprise a fluid pathway 415 disposed therethrough, and the ball 409 may be rotated to align or misalign the fluid pathway through the ball 409 with the interior flowpath 404 through the valve seat, thereby opening or closing the valve, respectively. While described in terms of a ball 409 engaging a seat, it will be appreciated that the valve seat 400 may be configured to engage other valve or sealing elements such as flapper elements in flapper type valves and/or valve gates in gate valves.

The interior flowpath 404 through the valve seat 400 may comprise several distinct flow portions including, but not limited to, a flow section 414 and an expansion section 416. The valve seat 400 may be integrally formed from a single body 402 portion, although it will be appreciated by one of ordinary skill in the art that the various sections of the valve seat 400 may be contained in separate components that are coupled together. Fluid flowing through the ball 409 and into the flow passage 404 may first flow through the first end 408. The flow section 414 may have a relatively uniform diameter 420 along its length 419. The diameter 424 of the expansion section 416 is greater than the diameter 420 of the flow section 414 and may be relatively uniform along its length 422. The expansion section 416 extends to the second end 406 of the valve seat 400. The diameter 420 of the flow section 414 is less than the diameter 424 of the expansion section 416, thereby creating a shoulder 426 at the intersection of the flow section 414 and the expansion section 416. The shoulder 426 may be formed in any of the configurations described above with respect to the shoulder 226 of the nozzle 200. The diameters and lengths of the flow section 414, and/or the expansion section 416 may vary depending on the particular application in which the valve seat 400 is used, and may be the same as or similar to those described above with respect to the nozzle 200.

The valve may be operated in several configurations. When the valve is closed, fluid may be present on both sides of the valve. When the ball 409 is rotated to align the fluid pathway 415 through the ball 409 with the interior flowpath 404, fluid may begin to flow towards the valve body 400. When the fluid pressure on the first end 408 of the valve body 400 exceeds the fluid pressure on the second end 406 of the valve seat 400, the fluid may flow through the valve body 400 from the first end 408 to the second end 406. Upon initiation of flow through the valve seat 400, the fluid may expand out of the flow section 414, past the shoulder 426, and flow in a conical flow pattern into the expansion section 416. Due to the conical flow pattern touching or almost touching (e.g., smaller than the walls of the body 402) the walls of the body 402 in the expansion section 416, fluid flow into the expansion section 416 from adjacent the second end 406 of the valve seat 400 may be reduced or prevented. A chamber 302 (as shown in FIGS. 3A and 3B) may then be formed with a pressure below that of the ambient pressure adjacent the second end 406 of the valve seat 400. In an embodiment in which the fluid flow is smaller than the walls of the body 402, some amount of backflow may be allowed into the expansion section 416 of the valve seat 400 (e.g., into a chamber in the expansion section 416) to affect the pressure in the chamber. The amount of pressure supplied to the chamber from the ambient environment adjacent the second end 406 may vary, and in an embodiment, may be in any of the ranges described herein with respect to the nozzle 200. The resulting fluid flow through the valve seat 400 from the first end 408 to the second end 406 may experience a decreased pressure drop and/or an increased flowrate through the valve seat 400. This may be advantageous in reducing the pressure losses past the valve seat 400.

Figure 5A:
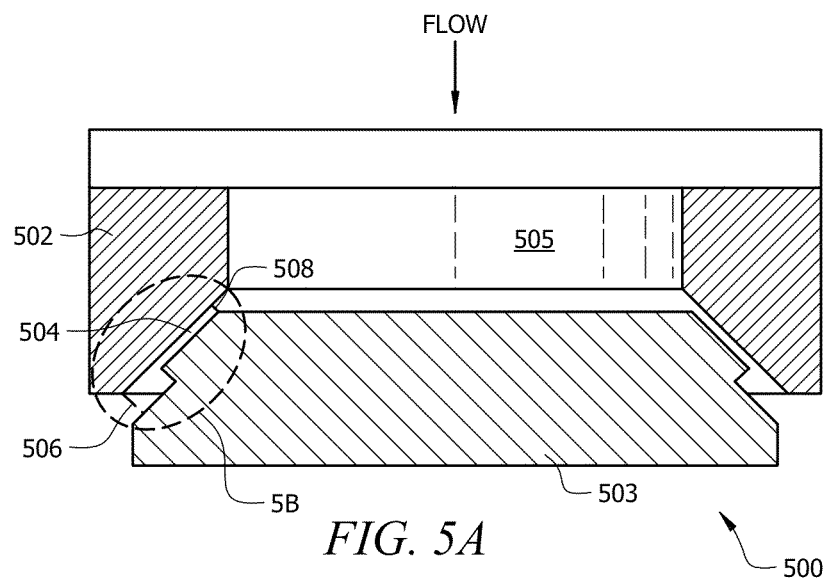
FIGS. 5A and 5B are schematic cross-sectional views of an embodiment of a pump discharge valve.
Figure 5B:
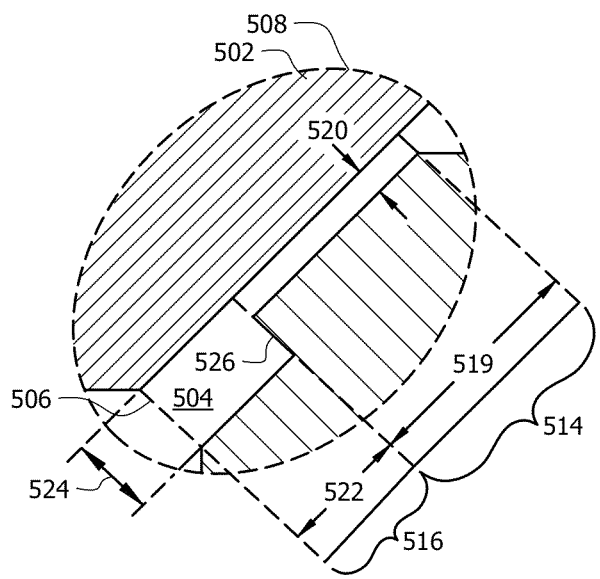

In an embodiment as shown in FIGS. 5A and 5B, a pump discharge valve 500 is illustrated. In general, a pump discharge valve 500 is used at the outlet of a pump to allow fluid to flow through the valve (e.g., exit the pump), while preventing reverse flow through the valve (e.g., prevent fluid from entering the pump). The pump discharge valve 500 generally comprises a body 502 and a poppet 503 configured to engage the body 502. The poppet may be retained in engagement with the body by a biasing member. When a pressure within a chamber 505 adjacent the poppet 503 exceeds the pressure on the opposite side of the poppet 503 and overcomes the biasing force from the biasing member, the poppet 503 may translate out of engagement with the body 502 to thereby allow fluid to flow between the body 502 and the poppet 503. A pressure differential on the opposite side of the poppet 503 that is greater than the pressure within the chamber 505 may further bias the poppet 503 into sealing engagement with the body 502, thereby preventing reverse flow into the chamber 505. While described as a pump discharge valve 500, any of a variety of one-way or check valves may operate in a similar manner and the principles described herein may apply to any suitable one-way or check valve. In an embodiment, the poppet 503 may comprise a shoulder 526 formed on an outer diameter thereof. In some embodiments, the shoulder may alternatively or additionally be present on the inner surface of the body 502.

As illustrated in FIGS. 5A and 5B, when the poppet 503 is separated from the body 502, a fluid pathway 504 is formed that may be configured similarly to the nozzle 200 described herein. The fluid pathway 504 may be formed on one side by the inner diameter of the body 502 and on a second side by the outer diameter of the poppet 503. The fluid pathway 504 may comprise a first end 508 (e.g., fluid inlet) and a second end 506 (e.g., fluid discharge). The fluid pathway 504 through the pump discharge valve 500 may comprise several distinct flow portions including, but not limited to, a flow section 514 and an expansion section 516. Fluid flowing through the pump discharge valve 500 may first flow through the first end 508. The fluid pathway 504 may have a relatively uniform annular opening 520 along its length 519. The diameter 524 of the expansion section 516 is greater than the annular opening 520 of the flow section 514 and may be relatively uniform along its length 522. The expansion section 516 extends to the second end 506 of the fluid pathway 504. The annular opening 520 of the flow section 514 is less than the annular opening 524 of the expansion section 516, thereby creating a shoulder 526 at the intersection of the flow section 514 and the expansion section 516. The shoulder 526 may be formed in any of the configurations described above with respect to the shoulder 226 of the nozzle 200. In an embodiment, the diameters and lengths of the flow section 514 and/or the expansion section 516 may vary depending on the particular application in which the pump discharge valve 500 is used, and may be the same as or similar to those described above with respect to the nozzle 200.

The pump discharge valve 500 may be operated in several configurations. A pump element may provide a fluid to the chamber 505, which may exert a pressure on the poppet 503. When the pressure provides a sufficient force to overcome any pressure on the opposite side of the poppet as well as a biasing force from a biasing element on the poppet 503, the poppet 503 may disengage from the body 502 and form a fluid pathway 504 between the body 502 and the poppet 503. The shoulder 526 on the poppet 503 may be disposed along the fluid pathway 504, thereby forming the flow section 514 and the expansion section 516. As the fluid pathway 504 is formed, fluid may begin to flow from the first end 508 of the fluid pathway 504 to the second end 506 of the fluid pathway 504. Upon initiation of fluid flow through the fluid pathway 504, the fluid may expand out of the flow section 514, past the shoulder 526, and flow in a flow pattern into the expansion section 516. Due to the flow pattern touching or almost touching (e.g., smaller than) the inner diameter of the body 502 and/or the outer diameter of the poppet 503 in the expansion section 516, fluid flow into the expansion section 516 from adjacent the second end 506 of the pump discharge valve 500 may be reduced or prevented. A chamber (e.g., like chamber 302 of FIGS. 3A and 3B) may then be formed with a pressure below that of the ambient pressure adjacent the second end 506 of the fluid pathway 504. In an embodiment in which the fluid flow is smaller than the inner diameter of the body 502 and/or the outer diameter of the poppet 503 in the expansion section 516, some amount of backflow may be allowed into the expansion section 516 of the fluid pathway 504 (e.g., into a chamber in the expansion section 516) to affect the pressure in the chamber. The amount of pressure supplied to the chamber from the downstream environment may vary, and in an embodiment, may be in any of the ranges described herein with respect to the nozzle 200. The resulting fluid flow through the fluid pathway 504 from the first end 508 to the second end 506 may experience a decreased pressure drop and/or an increased flowrate through the fluid pathway 504 in the pump discharge valve 500. This may be advantageous in reducing the horsepower requirements for the pump. In an embodiment, the horsepower requirements for a pump utilizing the pump discharge valve design described herein may have a power consumption between about 1% and about 5% less than a comparative pump that does not comprise the shoulder 526 and resulting flow sections 514, 516 but is otherwise the same.

Figure 6:
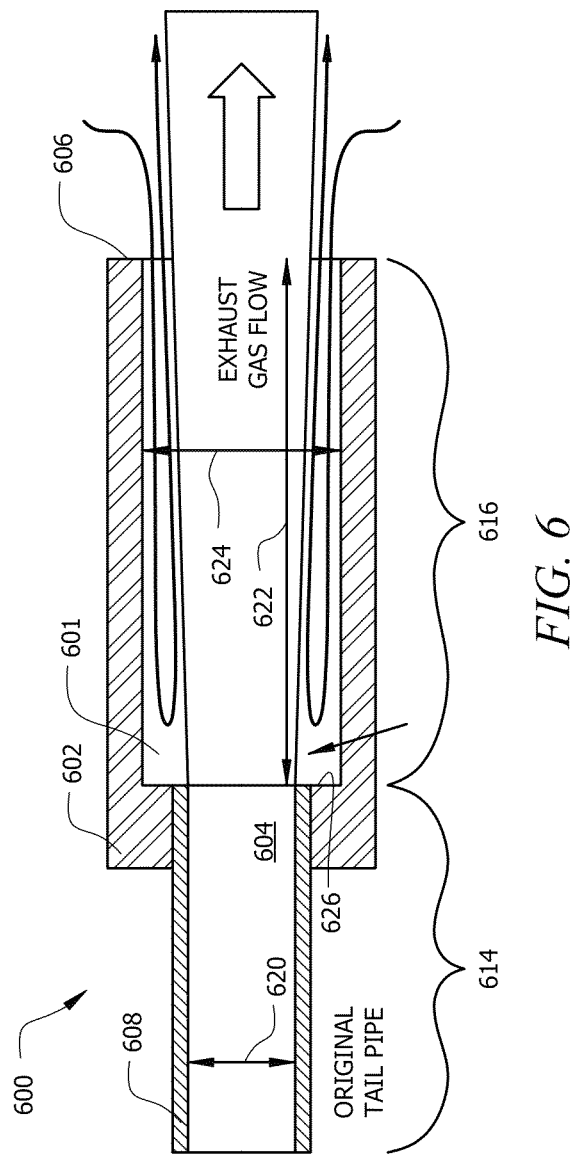
FIG. 6 is a schematic cross-sectional view of an embodiment of an exhaust pipe.

In an embodiment as shown in FIG. 6, an exhaust pipe 600 is illustrated. As illustrated, the exhaust pipe 600 is configured similarly to the nozzle 200. The exhaust pipe 600 comprises a body 602 defining an interior flowpath 604. The exhaust pipe 600 comprises a first portion 608 and a second end 606. The first portion 608 comprises a fluid conduit coupled to any of a number of process units. In an embodiment, the first portion may be in fluid communication with an engine (e.g., automobile engine, industrial engine, etc.), a vent line or vent tank, a combustion source, a safety discharge line, or the like. The interior flowpath 604 through the exhaust pipe 600 may comprise several distinct flow portions including, but not limited to, a flow section 614 through the first portion 608 and an expansion section 616. The exhaust pipe 600 may be integrally formed from a single body 602 portion. It will be appreciated by one of ordinary skill in the art that the various sections (e.g., the expansion section 616) may be contained in separate components that are coupled together, for example the expansion section 616 may be an add-on component to an existing exhaust pipe (e.g., an automobile tail pipe, truck exhaust stack, etc.).

Fluid generally flows from the exhaust pipe 600 to the ambient environment past the second end 606. In this flow configuration, fluid may first flow through the first portion 608. The flow section 614 may have a relatively uniform diameter 620. The length of the flow section 614 may be selected to allow for fluid communication with a desired processing unit. The diameter 624 of the expansion section 616 is greater than the diameter 620 of the flow section 614 and may be relatively uniform along its length 622. The expansion section 616 extends to the second end 606 of the exhaust pipe 600. The diameter 620 of the flow section 614 is less than the diameter 624 of the expansion section 616, thereby creating a shoulder 626 at the intersection of the flow section 614 and the expansion section 616. The shoulder 626 may be formed in any of the configurations described above with respect to the shoulder 226 of the nozzle 200. In an embodiment, the diameters and lengths of the flow section 614 and/or the expansion section 616 may vary depending on the particular application in which the exhaust pipe 600 is used, and may be the same as or similar to those described above with respect to the nozzle 200.

In an embodiment, the fluid flowing through the exhaust pipe 600 may be a gas. When the fluid is a gas, the diameter 624 of the expansion section 616 may expand along the length 622 of the expansion section 616 so that the diameter 624 increases starting at the shoulder 626 and moving to the second end 606. In an embodiment, the expansion section 616 may have a conical, frusto-conical, or trapezoidal cross-section. The expansion may be configured to provide for the expansion of the gas stream as the pressure drops along the length 622 of the expansion section 616. The increase in diameter 624 may occur gradually (e.g., at a constant slope) and/or a in series of steps (e.g., sharp, rounded, or curved shoulders). While the diameter 624 of the expansion section 616 may increase, the diameter of the interior flowpath 604 at the second end 606 may still be approximately equal to or slightly smaller than the diameter of the fluid stream at the second end resulting from the natural expansion of the fluid stream.

When the fluid pressure within the first portion 608 of the exhaust pipe 600 exceeds the fluid pressure (e.g., atmospheric pressure) beyond the second end 606 of the exhaust pipe 600, the fluid may flow through the exhaust pipe 600 from the first portion 608 to the second end 606. As fluid flows through the exhaust pipe 600, the fluid may expand out of the flow section 614, past the shoulder 626, and flow in a conical flow pattern into the expansion section 616. Due to the conical flow pattern touching or almost touching (e.g., smaller than the walls of the body 602) the walls of the body 602 near the second end 606 of the expansion section 616, fluid flow into the expansion section 616 from adjacent the second end 606 of the exhaust pipe 600 is reduced or prevented. A chamber 601 (e.g., like chamber 302 of FIGS. 3A and 3B) may then be formed with a pressure below that of the ambient pressure adjacent the second end 606 of the exhaust pipe 600. In an embodiment in which the fluid flow is smaller than the walls of the body 602, some amount of backflow may be allowed into the expansion section 616 of the exhaust pipe 600 (e.g., into a chamber 601 in the expansion section 616) to affect the pressure in the chamber 601. The amount of pressure supplied to the chamber 601 from the downstream environment may vary, and in an embodiment, may be in any of the ranges described herein with respect to the nozzle 200. The resulting fluid flow through the exhaust pipe 600 from the first portion 608 to the second end 606 may experience a decreased pressure drop and/or an increased flowrate through the exhaust pipe 600. In some embodiments, this may be advantageous in reducing the pressure losses in exhaust pipe 600. The resulting decrease in back pressure may improve the efficiency of various upstream processes such an internal combustion engine. In some embodiments, an engine coupled upstream of the exhaust pipe 600 may experience an increase in fuel efficiency between about 2% to about 10%, or about 5% to about 7% as compared to the same engine that is not coupled to an exhaust pipe 600 comprising the shoulder 626 and resulting flow sections 614, 616 (e.g., in contrast to a constant diameter exhaust pipe).

Figure 7:
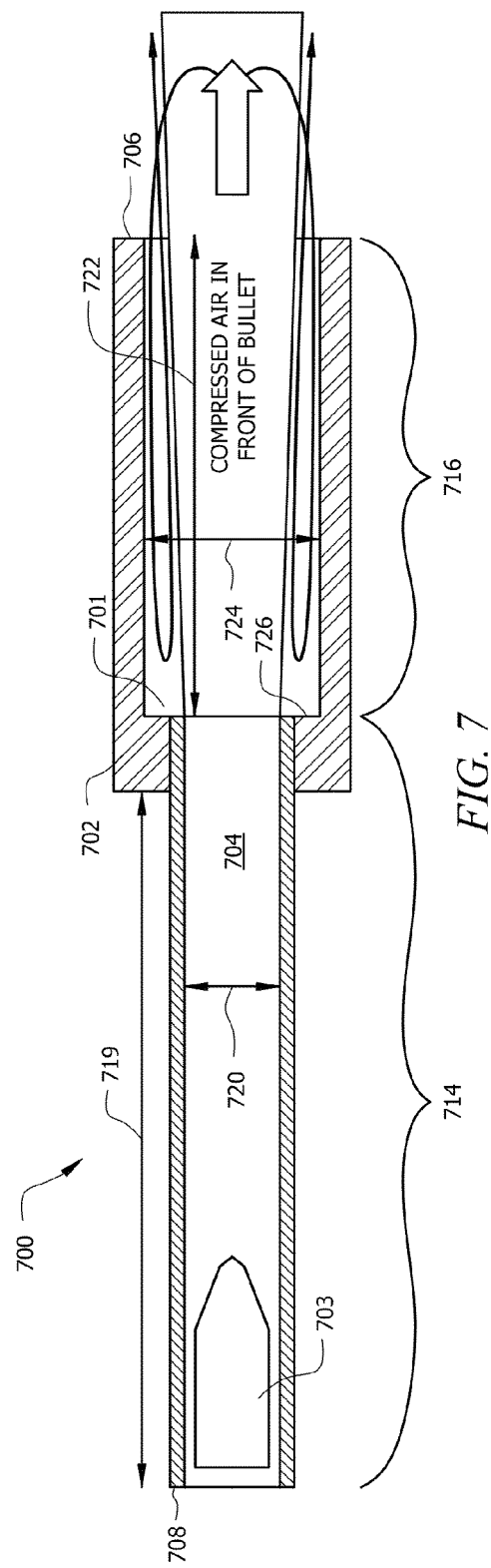
FIG. 7 is a schematic cross-sectional view of an embodiment of a launch tube.

In an embodiment as shown in FIG. 7, a launch tube 700 is illustrated. As illustrated, the launch tube 700 is configured similarly to the nozzle 200. The launch tube 700 may be configured to contain and/or propel an object to be launched, fired, or propelled out of the launch tube 700. In an embodiment, the launch tube 700 comprises a gun barrel for firing a bullet or other ballistic component. In some embodiments, the launch tube 700 comprises a submarine launch tube for various projectiles, which may comprise self-propelled projectile (e.g., torpedoes). In still other embodiments, the launch tube 700 may comprise a missile launch tube, which may be used in air and/or in a liquid environment (e.g., underwater). In general, the launch tube 700 may comprise a projectile 703 disposed in the launch tube 700 and a fluid disposed in an interior flowpath 704 comprising a fluid. Upon launching the projectile 703, the fluid in the interior flowpath 704 may be required to be displaced to allow the projectile 703 to exit the launch tube 700. Typically, the fluid must be displaced quickly, thereby creating a high fluid flowrate out of the launch tube 700 during the launch process and an increased pressure in the fluid due to the driving force behind the projectile. The flow configuration illustrated in FIG. 7 may be used to reduce the pressure drop and/or energy loss due to displacing the fluid within the interior flowpath 704.

As illustrated in FIG. 7, the launch tube 700 comprises a body 702 defining the interior flowpath 704 therethrough. The launch tube 700 comprises a first end 708 wherein the projectile 703 may be disposed prior to initiating the launch. The launch tube 700 also comprises a second end 706 adjacent an ambient environment. The interior flowpath 704 through the launch tube 700 may comprise several distinct flow portions including, but not limited to, a launch section 714 and an expansion section 716. The launch tube 700 may be integrally formed from a single body 702 portion, although it will be appreciated by one of ordinary skill in the art that the various sections of the launch tube 700 may be contained in separate components that are coupled together. The launch section 714 may have a relatively uniform diameter 720 along its length 719. The diameter 724 of the expansion section 716 is greater than the diameter 720 of the launch section 714 and may be relatively uniform along its length 722. The expansion section 716 extends to the second end 706 of the launch tube 700. The diameter 720 of the launch section 714 is less than the diameter 724 of the expansion section 716, thereby creating a shoulder 726 at the intersection of the launch section 714 and the expansion section 716. The shoulder 726 may be formed in any of the configurations described above with respect to the shoulder 226 of the nozzle 200. In an embodiment, the diameters and lengths of the flow section launch section 714 and/or the expansion section 716 may vary depending on the particular application in which the launch tube 700 is used, and may be the same as or similar to those described above with respect to the nozzle 200. Since the effect is primarily dependent upon the pressure downstream of the launch tube, the deeper the location of the tube in water, the higher the efficiency due to the increased hydrostatic pressure.

In an embodiment, the fluid within the launch tube 700 may be a gas, and during the launch or firing of the projectile 703, the gas may be displaced from the launch tube 700. When the fluid is a gas, the diameter 720 of the expansion section 716 may expand along the length 722 of the expansion section 716 so that the diameter 724 increases starting at the shoulder 726 and moving to the second end 706. In an embodiment, the expansion section 716 may have a conical, frusto-conical, or trapezoidal cross-section. The expansion may be configured to provide for the expansion of the gas stream as the pressure drops along the length 722 of the expansion section 716. The increase in diameter 724 may occur gradually (e.g., at a constants slope) and/or a in series of steps (e.g., sharp, rounded, or curved shoulders). While the diameter 724 of the expansion section 716 may increase, the diameter of the interior flowpath 704 at the second end 706 may still be approximately equal to or slightly smaller than the diameter of the fluid stream at the second end resulting from the natural expansion of the fluid stream.

The launch tube 700 may be operated by first positioning the projectile 703 within the launch tube. In general, the projectile 703 may be stationary within the launch tube so that the fluid within the interior flowpath 704 is also stationary prior to initiating the launching or firing of the projectile 703. Upon the launching or firing of the projectile 703, the projectile may begin to move towards the second end 706, thereby displacing the fluid within the interior flowpath 704 towards the ambient environment. As the fluid is accelerated through the interior flowpath 704, the fluid may expand out of the launch section 714, past the shoulder 726, and flow in a conical flow pattern into the expansion section 716. Due to the conical flow pattern touching or almost touching (e.g., smaller than the walls of the body 702) the walls of the body 702 in the expansion section 716, fluid flow into the expansion section 716 from adjacent the second end 706 of the launch tube 700 may be reduced or prevented. A chamber 701 (e.g., like chamber 302 of FIGS. 3A and 3B) may then be formed with a pressure below that of the ambient pressure adjacent the second end 706 of the launch tube 700. In an embodiment in which the fluid flow is smaller than the walls of the body 702, some amount of backflow may be allowed into the expansion section 716 of the launch tube 700 (e.g., into a chamber 701 in the expansion section 716) to affect the pressure in the chamber 701. The fluid flowing into the chamber 701 may come from the ambient environment adjacent the second end 706 and/or from the fluid flowing out of the expansion section 716 such that a portion of the fluid may turn and enter the chamber 701. The amount of pressure supplied to the chamber from the ambient environment may vary, and in an embodiment, may be in any of the ranges described herein with respect to the nozzle 200. The resulting fluid flow out of the launch tube 700 ahead of the projectile 703 may experience a decreased pressure drop and/or present a decreased resistance to the movement of the projectile 703 out of the launch tube 700. This may be advantageous in allowing the projectile to retain energy, thus traveling further and/or faster. For example, a bullet may have an increased speed for a longer ballistic flight, a torpedo may accelerate out of a launch tube with an increased velocity to strike a target sooner, or a missile may launch with a decreased fuel consumption to allow for a longer flight range. The effectiveness of the feature in the case of the bullet is air may be limited by the air pressure (e.g., an atmospheric pressure of about 14.7 psia). However, the velocity of the of the bullet may generate a relatively large pressure within the launch tube and/or barrel, and the resulting increase in the back pressure due to the sudden acceleration of the bullet may be key to the performance improvement. In an embodiment, the use of the launch tube as described herein may result in an increased velocity of a projectile leaving the launch tube of between about 1% and about 20% for a projectile launched in a gas (e.g., in air), or between about 5% and about 40% for a projectile launched in a liquid (e.g., a subsea launch).

Figure 8:
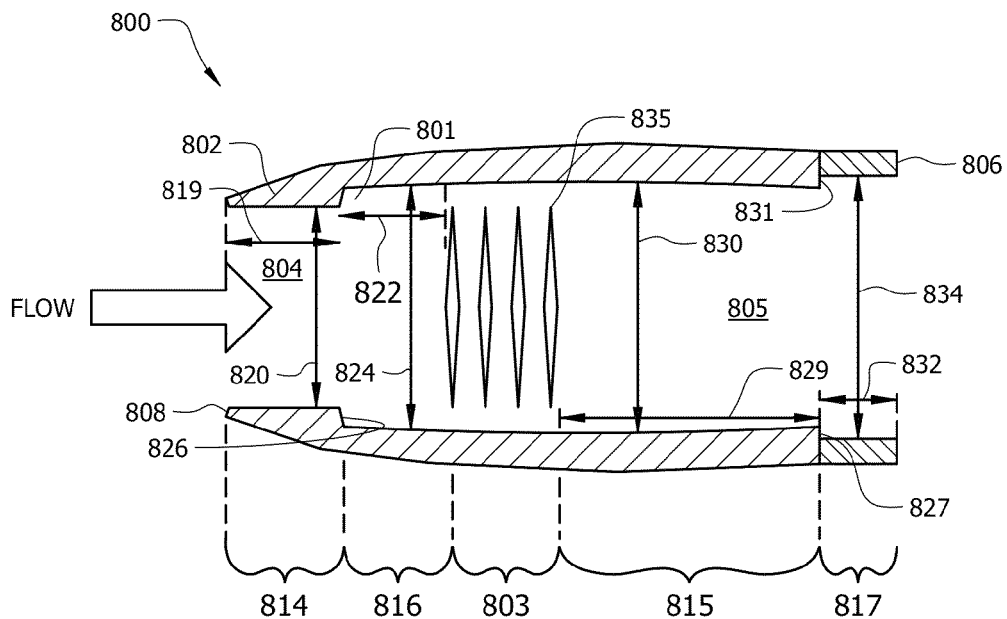
FIG. 8 is a schematic cross-sectional view of an embodiment of an engine.

In an embodiment as shown in FIG. 8, a turbine engine 800 (e.g., an aircraft engine, a turbine generator, etc.) is illustrated. As illustrated, portions of the turbine engine 800 are configured similarly to the nozzle 200. In general, the engine 800 comprises a body 802 comprising a first interior flowpath 804 upstream of a combustion section 803 and a second interior flowpath 805 downstream of the combustion section 803. In general, the combustion section may comprise one or more sets of turbine blades 835 upstream and/or downstream of a combustion chamber. The combustion section 803 may be configured to contact fuel with at least a portion of the incoming air, combust the fuel to increase the temperature of the mixture, and pass the mixture through one or more downstream sets of turbines that power the upstream one or more sets of turbines. In some embodiments, the one or more sets of turbines may be coupled by a shaft to a generator to produce shaft work for generating electricity. The net effect of the turbine engine 800 is to produce thrust for an aircraft and/or shaft work for generating electricity. The turbine engine 800 comprises a first end 808 and a second end 806. The first interior flowpath 804 upstream of the combustion section 803 may comprise several distinct flow portions including, but not limited to, an inlet flow section 814 and an expansion section 816. The second interior flowpath 805 downstream of the combustion section 803 may comprise several distinct flow portions including, but not limited to, a flow section 815 and an outlet expansion section 817. It will be appreciated by one of ordinary skill in the art that the various sections and components of the turbine engine 800 may be contained in separate components that are coupled together. In some embodiments, the body 802 may be integrally formed from a single body 802 portion.

Fluid (e.g., air, air/fuel, etc.) generally flows from the ambient environment upstream of the turbine engine into the inlet 808, through the turbine engine 800 and exits the turbine engine 800 at the exhaust 806. The fluid flowing through the turbine engine 800 may generally pass through the first interior flowpath 804, then the combustion section 803, followed by the second interior flowpath 805. The first interior flowpath 804 may generally comprise the inlet flow section 814 and the expansion section 816. The inlet flow section 814 may have a relatively uniform diameter 820 along its length 819. The diameter 824 of the expansion section 816 is greater than the diameter 820 of the flow section 814 and may be relatively uniform along its length 822. The expansion section 816 extends to the combustion section 803. The diameter 820 of the flow section 814 is less than the diameter 824 of the expansion section 816, thereby creating a shoulder 826 at the intersection of the flow section 814 and the expansion section 816. The shoulder 826 may be formed in any of the configurations described above with respect to the shoulder 226 of the nozzle 200. In an embodiment, the diameters and lengths of the inlet flow section 814 and/or the expansion section 816 may vary depending on the particular application in which the turbine engine 800 is used, and may be the same as or similar to those described above with respect to the nozzle 200.

Similarly, the second interior flowpath 805 may generally comprise the flow section 815 and the outlet expansion section 817. The flow section 815 may have a relatively uniform diameter 830 along its length 829. The diameter 834 of the outlet expansion section 817 is greater than the diameter 830 of the flow section 815 and may be relatively uniform along its length 832. The outlet expansion section 817 extends to the outlet 806. The diameter 830 of the flow section 815 is less than the diameter 834 of the outlet expansion section 817, thereby creating a shoulder 827 at the intersection of the flow section 815 and the outlet expansion section 817. The shoulder 827 may be formed in any of the configurations described above with respect to the shoulder 226 of the nozzle 200. In an embodiment, the diameters and lengths of the flow section 815 and/or the outlet expansion section 817 may vary depending on the particular application in which the turbine engine is used, and may be the same as or similar to those described above with respect to the nozzle 200.

In an embodiment, the fluid flowing through the first interior flowpath 804 and/or the second interior flowpath 805 may be a gas. When the fluid is a gas, the diameter 824 of the expansion section 816 and/or the diameter 834 of the outlet expansion section 817 may expand along the length 822, 832, respectively, from the upstream end to the downstream end. In an embodiment, the expansion section 816 and/or outlet expansion section 817 may have a conical, frusto-conical, or trapezoidal cross-section. The expansion may be configured to provide for the expansion of the gas stream as the pressure drops along the length of the expansion section 816 and/or the outlet expansion section 817. The increase in diameter may occur gradually (e.g., at a constant slope) and/or a in series of steps (e.g., sharp, rounded, or curved shoulders). While the diameter of the expansion section 816 and/or the outlet expansion section 817 may increase, the diameter of the first interior flowpath 804 and/or the second interior flowpath 805 may still be approximately equal to or slightly smaller than the diameter of the fluid stream resulting from the natural expansion of the fluid stream.

In use, a fluid may be moving through the turbine engine 800 due to the action of the one or more sets of turbines and the combustion section 803. The turbine engine 800 may be moving, for example on an airplane, or stationary, for example when used with power generation. In either case, the fluid may flow into the inlet 808, through the first interior flowpath 804, through the combustion section 803, through the second interior flowpath 805, and out the exhaust 806.

As fluid flows through the first interior flowpath, the fluid may expand out of the inlet flow section 814, past the shoulder 826, and flow in a conical flow pattern into the expansion section 816. Due to the conical flow pattern touching or almost touching (e.g., smaller than the walls of the body 802) the walls of the body 802 near the combustion section 803, fluid flow into the expansion section 816 from the combustion section 803 may be reduced or prevented. A chamber 801 (e.g., like chamber 302 of FIGS. 3A and 3B) may then be formed with a pressure below that of the ambient pressure in the combustion section 803. In an embodiment in which the fluid flow is smaller than the walls of the body 802, some amount of backflow may be allowed into the expansion section 816 of the first interior flowpath 804 (e.g., into a chamber 801 in the expansion section 816) to affect the pressure in the chamber 801. The amount of pressure supplied to the chamber from the combustion section 803 may vary, and in an embodiment, may be in any of the ranges described herein with respect to the nozzle 200. The resulting fluid flow through the first interior flowpath 804 may experience a decreased pressure drop and/or an increased flowrate through the first interior flowpath 804.

Similarly as fluid flows through the second interior flowpath 805, the fluid may expand out of the flow section 815, past the shoulder 827, and flow in a conical flow pattern into the outlet expansion section 817. Due to the conical flow pattern touching or almost touching (e.g., smaller than the walls of the body 802) the walls of the body 802 near the exhaust 806, fluid flow into the expansion section 817 from the ambient environment adjacent the exhaust 806 may be reduced or prevented. A chamber 831 (e.g., like chamber 302 of FIGS. 3A and 3B) may then be formed with a pressure below that of the ambient pressure in the ambient environment adjacent the exhaust 806. In an embodiment in which the fluid flow is smaller than the walls of the body 802, some amount of backflow may be allowed into the expansion section 817 of the second interior flowpath 805 (e.g., into a chamber 831 in the outlet expansion section 817) to affect the pressure in the chamber 831. The amount of pressure supplied to the chamber 831 from the ambient environment may vary, and in an embodiment, may be in any of the ranges described herein with respect to the nozzle 200. The resulting fluid flow through the second interior flowpath 805 may experience a decreased pressure drop and/or an increased flowrate.

In some embodiments, the use of a flow section and expansion section adjacent the inlet 808 and/or the outlet 806 may be advantageous in reducing the pressure losses and/or achieving a higher fluid flowrate in turbine engine 800. The resulting decrease in back pressure may improve the efficiency, horsepower, and/or electrical output of the turbine engine 800. In some embodiments, a turbine engine 800 may experience an increase in fuel efficiency between about 2% to about 10%, or about 5% to about 7% as compared to the same engine that is not coupled to an exhaust pipe 700 comprising the shoulder 826 and/or shoulder 827 and resulting flow sections 814, 816 and/or flow sections 815, 817, respectively.

Figure 9:
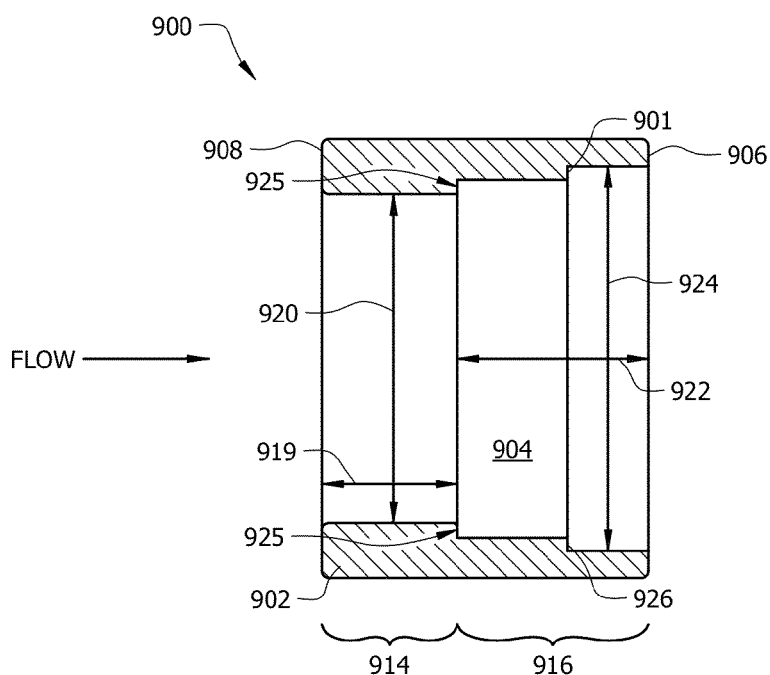
FIG. 9 is a schematic cross-sectional view of an embodiment of a blower assembly.

In an embodiment as shown in FIG. 9, a blower assembly 900 is illustrated. As illustrated, the blower assembly 900 is configured similarly to the nozzle 200. The blower assembly 900 may be used to move a fluid such as air. In some embodiments, the blower assembly 900 may be used to accelerate a small portion of air in a fan or larger blower assembly configured to create drag and induce movement in a larger portion of air. In this embodiment, the small portion of air, as represented by flow arrows 925, can be accelerated and used to create a bulk flow of a larger portion of the air. Such a configuration may also be used to create a bulk flow of a liquid.

As illustrated in FIG. 9, the blower assembly 900 comprises a body 902 defining an interior flowpath 904. The blower assembly 900 comprises an inlet 908 and an exhaust 906. The interior flowpath 904 through the blower assembly 900 may comprise several distinct flow portions including, but not limited to, a flow section 914 and an expansion section 916. The blower assembly 900 may be integrally formed from a single body 902 portion. It will be appreciated by one of ordinary skill in the art that the various sections (e.g., the expansion section 916) may be contained in separate components that are coupled together.

A pressurized fluid is generally introduced into the inlet 908 and flows through the interior flowpath 904 to the outlet 906. In this flow configuration, fluid may first flow through the flow section 914. The flow section 914 may have a relatively uniform diameter 920 along its length 919, though the diameter 920 may change along the length 919. The diameter 924 of the expansion section 916 is greater than the diameter 920 of the flow section 914 and may be relatively uniform along its length 922. The expansion section 916 extends to the end of the exhaust 906. The diameter 920 of the flow section 914 is less than the diameter 924 of the expansion section 916, thereby creating one or more shoulders 925, 926 along the length 922 of the expansion section 916. The shoulders 925, 926 may be formed in any of the configurations described above with respect to the shoulder 226 of the nozzle 200. In an embodiment, the diameters and lengths of the flow section 914 and/or the expansion section 916 may vary depending on the particular application in which the blower assembly 900 is used, and may be the same as or similar to those described above with respect to the nozzle 200.

In an embodiment, the fluid flowing through the blower assembly 900 may be a gas. When the fluid is a gas, the diameter 924 of the expansion section 916 may expand along the length 922 of the expansion section 916 so that the diameter 924 increases starting at the shoulder 925 and moving to the exhaust 906. In an embodiment, the expansion section 916 may have a conical, frusto-conical, stepped, or trapezoidal cross-section. The expansion may be configured to provide for the expansion of the gas stream as the pressure drops along the length 922 of the expansion section 916. The increase in diameter 924 may occur gradually (e.g., at a constant slope) and/or a in series of steps (e.g., sharp, rounded, or curved shoulders) such as those formed by shoulder 925. While the diameter 924 of the expansion section 916 may increase, the diameter of the interior flowpath 904 at the exhaust 906 may still be approximately equal to or slightly smaller than the diameter of the fluid stream at the second end resulting from the natural expansion of the fluid stream.

When the fluid pressure upstream of the inlet 908 of the blower assembly 900 exceeds the fluid pressure (e.g., atmospheric pressure) beyond the exhaust 906, the fluid may flow through the blower assembly 900 from the inlet 908 to the exhaust 906. As fluid flows through the blower assembly 900, the fluid may expand out of the flow section 914, past the shoulder 925 and shoulder 926, and flow in a conical flow pattern into the expansion section 916. Due to the conical flow pattern touching or almost touching (e.g., smaller than the walls of the body 902) the walls of the body 902 near the exhaust 906 end of the expansion section 916, fluid flow into the expansion section 916 from adjacent the exhaust 906 of the blower assembly 900 may be reduced or prevented. A chamber 901 (e.g., like chamber 302 of FIGS. 3A and 3B) may then be formed with a pressure below that of the ambient pressure adjacent the exhaust 906 end of the blower assembly 900. In an embodiment in which the fluid flow is smaller than the walls of the body 902, some amount of backflow may be allowed into the expansion section 916 (e.g., into the chamber 901 in the expansion section 916) to affect the pressure in the chamber 901. The amount of pressure supplied to the chamber 901 from the downstream environment may vary, and in an embodiment, may be in any of the ranges described herein with respect to the nozzle 200. The resulting fluid flow through the blower assembly 900 from the inlet 908 to the exhaust 906 may experience a decreased pressure drop and/or an increased flowrate through the blower assembly 900. In some embodiments, this may be advantageous in reducing the pressure losses in blower assembly 900.

In some embodiments, the blower assembly 900 may comprise a portion of a larger inducted flow blower assembly. The blower assembly 900 may be an elongated structure having the cross-section illustrated in FIG. 9. The interior flowpath 904 may comprise a slot or other such structure. In some embodiments, the blower assembly 900 may form an enclosed, elongated structure such that the elongated interior flowpath 904 (e.g., a slot-like interior flowpath 904) forms a continuous path. For example, the enclosed, elongated structure may form a circular, oval, rectangular, triangular, oblong, elliptical, or other closed structure having a slot like exhaust 906. The resulting fluid flow out of the exhaust 906 may form a sheet like fluid flow conforming to the shape of the enclosed, elongated structure (e.g., a circular structure would form a hollow tube like fluid flow, etc.). When the blower assembly 900 forms an enclosed, elongated structure, the fluid stream formed by the blower assembly 900 may also form a closed fluid stream defining a volume of fluid within the closed area. Based on fluid dynamics, the fluid within the closed area is subjected to drag based on the moving fluid stream exiting the exhaust, and the fluid within the closed area can be accelerated and entrained with the closed fluid stream. Such a configuration may be used to generate or induce a bulk fluid flow within the closed area based on the fluid stream exiting the blower assembly 900. As the use of the blower assembly 900 design disclosed herein may generate a higher fluid flow velocity and/or a greater flowrate out of the exhaust 906, the blower assembly 900 may also be used to induce a greater bulk flowrate out of the blower assembly 900.

Returning to FIGS. 2 and 3, the nozzle may be used in various other industries. For example, the nozzle 200 may be used in a blower assembly for use in moving air for landscaping. A typical landscape blower may generate approximately 30 psia to about 50 psia. In some embodiments, some amount of backflow may be allowed into the expansion section 216 (e.g., into a chamber 302 in the expansion section 216) to affect the pressure in the chamber. Based on atmospheric pressure, between about 2 psia and about 12 psia, or between about 5 psia and about 9 psia may be introduced into the chamber 302 to reduce the resulting drag on the air stream passing through the blower assembly. Thus, the air being emitted from the blower assembly may have a higher velocity and/or a greater amount of air may be emitted as compared to a similar nozzle not comprising the shoulder 226 and flow sections 214, 216. Similarly, the design of the nozzle in FIGS. 2 and 3 may be used in a jet propulsion device. In these devices, a fluid is pressurized and passed out of the nozzle. The resulting thrust out of the nozzle is used to propel various device such as floating boats, subsea vessels (submarines, Remote Operated Vehicles, personal watercraft, etc.). In general, the deeper the location of the underwater propulsion device comprising the nozzle as described herein, the greater the increase in efficiency of the nozzle design. The use of the design of the nozzle 200 may allow the fluid to be emitted with a higher velocity and/or a greater amount of fluid may be emitted as compared to a similar nozzle not comprising the shoulder 226 and flow sections 214, 216.

As these embodiments demonstrate, the design of the nozzle may be used in a variety of settings and device in various industries. While initially described in terms of a nozzle, the use of device comprising a fluid pathway having a plurality of flow sections separated by a shoulder may be applicable to any number of devices other than nozzles.

Having described the systems and methods, various embodiments may include, but are not limited to:

In a first embodiment, a jetting device comprises a body; and an interior flow path within the body, wherein the interior flow path comprises: a flow section; an expansion section; and a shoulder formed at the intersection of the flow section and the expansion section, wherein the length and diameter of the expansion section are configured to allow a portion of the pressure of the fluid downstream of the expansion section to provide power to a fluid flowing through the jetting device when the fluid is flowing through the jetting device.

A second embodiment may include the jetting device of the first embodiment, wherein a length and a diameter of an expansion section of the jetting device are configured such that a fluid stream diameter of a fluid stream discharged from the jetting device is less than the diameter of the expansion section at an outer end of the jetting device.

A third embodiment may include the jetting device of the first or second embodiment, wherein the portion of the pressure of the fluid downstream of the expansion section is at least about 10% of the pressure of the fluid downstream of the expansion section.

A fourth embodiment may include the jetting device of any of the first to third embodiments, wherein the portion of the pressure of the fluid downstream of the expansion section is less than about 80% of the pressure of the fluid downstream of the expansion section.

In a fifth embodiment, a flow device comprises a body; and an interior flow path within the body, wherein the interior flow path comprises: a flow section; an expansion section; and a shoulder formed at the intersection of the flow section and the expansion section, wherein the length and diameter of the expansion section are configured to control the amount of backflow of fluid into the expansion section when a fluid is flowing through the flow device.

A sixth embodiment may include the flow device of the fifth embodiment, wherein the expansion section has an area about 1.01 to about 1.5 times greater than an area of the flow section.

A seventh embodiment may include the flow device of the fifth or sixth embodiment, wherein the expansion section comprises a chamber between a fluid flowing through the interior flowpath and the inner edge of the expansion section.

An eighth embodiment may include the flow device of any of the fifth to seventh embodiments, wherein the flow device comprises a valve seat, wherein the valve seat further comprises a sealing element disposed in the interior flow path, and wherein the sealing element is configured to transition between an open position allowing fluid flow through the interior flow path and a closed position blocking fluid flow through the interior flow path.

A ninth embodiment may include the flow device of any of the fifth to eighth embodiments, wherein the flow device comprises a pump discharge valve, wherein the pump discharge valve further comprises a poppet disposed adjacent the body, wherein the interior flow path is disposed within the body between the body and the poppet, and wherein a power requirement for a pump comprising the pump discharge valve has a power consumption between about 1% and about 5% less than a comparative pump that does not comprise the flow section, expansion section, and shoulder.

A tenth embodiment may include the flow device of any of the fifth to ninth embodiments, wherein the flow device comprises an exhaust pipe, wherein an engine is coupled upstream of the exhaust pipe, and wherein a fuel efficiency for the engine is between about 2% and about 10% greater than a comparative engine that is not coupled to an exhaust pipe comprising the flow section, expansion section, and shoulder.

An eleventh embodiment may include the flow device of any of the fifth to tenth embodiments, wherein the flow device comprises a launch tube, and wherein the launch tube is configured to have a fluid flowing through the interior flow path when a projectile is launched from the flow section through the expansion section.

A twelfth embodiment may include the flow device of any of the fifth to tenth embodiments, wherein the flow device comprises a turbine engine, wherein the turbine engine comprises the flow section, the expansion section, and the shoulder between an inlet and a combustion section.

A thirteenth embodiment may include the flow device of any of the fifth to twelfth embodiments, wherein the flow device comprises a turbine engine, wherein the turbine engine comprises the flow section, the expansion section, and the shoulder between a combustion section and an exhaust.

A fourteenth embodiment may include the flow device of any of the fifth to thirteenth embodiments, wherein the flow device comprises a blower assembly, wherein the interior flow path is configured to receive a fluid from a blower.

A fifteenth embodiment may include the flow device of any of the fifth to fourteenth embodiments, wherein the interior flow path is configured to allow a portion of a flow energy of the fluid flowing through the flow device to be derived from a pressure downstream of the flow device.

In a sixteenth embodiment, a method of jetting comprises providing a pressurized fluid to an interior flow path disposed in a device body; passing the pressurized fluid through a flow section in the interior flow path and into an expansion section in the interior flow path; expanding the fluid into an expansion section; receiving a fluid within a chamber formed within the expansion section from an environment adjacent an end of the expansion section; and forming a fluid stream, wherein at least one of the velocity or flowrate of the fluid stream is based on the expansion of the fluid into the expansion section and the fluid received into the chamber.

A seventeenth embodiment may include the flow device of the sixteenth embodiment, wherein the interior flow path is part of a service tool servicing a wellbore disposed in a subterranean formation.

An eighteenth embodiment may include the flow device of the seventeenth embodiment, wherein the pressurized fluid comprises an abrasive wellbore servicing fluid.

A nineteenth embodiment may include the flow device of any of the sixteenth to eighteenth embodiments, wherein the device body comprises a valve body.

A twentieth embodiment may include the flow device of any of the sixteenth to nineteenth embodiments, wherein the device body comprises at least one of an exhaust pipe, a launch tube, a turbine engine, or a blower assembly, and wherein the environment adjacent an end of the expansion section is at atmospheric pressure.

A twenty first embodiment may include the flow device of any of the sixteenth to twentieth embodiments, wherein the fluid comprises a gas or a liquid.

A twenty second embodiment may include the flow device of any of the sixteenth to twenty first embodiments, wherein at least a portion of a flow energy of the fluid stream is derived from a pressure of the fluid in the environment adjacent an end of the expansion section.

EXAMPLES

In order to illustrate the benefits of the nozzles as described herein, several comparative examples have been prepared. The nozzle of the present disclosure has been compared to a conventional jet nozzle (e.g., commercially available as jetting tools from a variety of vendors worldwide), and a Hydra-Jet nozzle (e.g., commercially available from Halliburton Energy Service, Inc., of Houston, Tex.), which do not comprise expansion chambers as described herein. In order to aid in comparison between the different nozzles, the same dimensions are used for the jets in each example unless otherwise noted (i.e. the internal diameters are the same). The conventional jetting tools generally have a $C_d$ of around 0.7 (based on published data). The Halliburton HydraJet nozzle has a $C_d$ of approximately 0.95 based upon test data. The "Current Nozzle" has an expansion chamber as described herein, and a $C_d$ of 1.3 was selected for discussion in this example.

Calculation of the flow rates was made using Eq. 1 as described in more detail above. First, the conventional nozzle example uses a pressure differential across the nozzle of 4500 pounds per square inch (psi). Based upon Eq. 1, the flow rate is 2.0189 BPM. Using the Halliburton jet nozzle at the same pressure produces a flow rate of 2.7399 BPM. The Current nozzle has a flowrate of 3.7493 BPM at the same pressure differential. In order to pump at approximately the same flow rate as the Halliburton nozzle (i.e., 2.7399 BPM), the pressure requirement for the new jet would be 2403.1 psi. Further, to pump at the same horsepower level as the Halliburton jet nozzle case, then, using the Current nozzle, the pressure differential would be 3651 psi, thereby producing a flowrate of about 3.377 BPM. The results of the nozzle calculations are shown in Table 1.

TABLE 1

Nozzle Calculation Results

| | $C_d$ | Jet Nozzle Diameter (in.) | Pressure (psig) | Fluid Density (lb/gal) | Flow Rate (Barrels/minute) |
|---|---|---|---|---|---|
| Conventional Jet Nozzle | 0.7 | 0.25 | 4500 | 8.9 | 2.0189 |
| Halliburton Jet Nozzle | 0.95 | 0.25 | 4500 | 8.9 | 2.7399 |
| Current Nozzle | 1.3 | 0.25 | 4500 | 8.9 | 3.7493 |
| Current Nozzle | 1.3 | 0.25 | 2403.1 | 8.9 | 2.7399 |
| Current Nozzle | 0.25 | 1.3 | 3651 | 8.9 | 3.3773 |

The results of the calculations indicate that the use of the expansion section with the nozzle as described herein allows for the nozzle to have a coefficient of discharge of 1.3. The resulting flow rate increase represents about an 85.7% increase over the convention jet nozzle and a 36.8% increase of the Halliburton jet nozzle using approximately the same input pressure. Alternatively, the use of the nozzle as described herein resulted in a 46.6% decrease in the pressure required to pass the same volume of fluid through the nozzle as compared to the Halliburton jet nozzle with a coefficient of discharge of 0.95. Accordingly, the nozzle comprising the expansion section illustrates an improvement over comparable nozzles not comprising an expansion section.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A method of jetting comprising:
   providing a pressurized fluid to an interior flow path disposed in a device body;
   passing the pressurized fluid through a flow section in the interior flow path and into an expansion section in the interior flow path;
   expanding the fluid into an expansion section;
   receiving a fluid within a chamber formed within the expansion section from an environment adjacent an end of the expansion section; and
   forming a fluid stream, wherein at least one of the velocity or flowrate of the fluid stream is based on the expansion of the fluid into the expansion section and the fluid received into the chamber.

2. The method of claim 1, wherein the fluid comprises a gas or a liquid.

3. The method of claim 1, wherein at least a portion of a flow energy of the fluid stream is derived from a pressure of the fluid in the environment adjacent an end of the expansion section.

\* \* \* \* \*